(12) United States Patent
Nagao

(10) Patent No.: US 12,052,397 B2
(45) Date of Patent: Jul. 30, 2024

(54) IMAGE PROCESSING DEVICE FOR DISPLAYING DEVICE INFORMATION AND EXECUTING JOBS BASED ON RECEIVED SETTING INFORMATION

(71) Applicant: SHARP KABUSHIKI KAISHA, Osaka (JP)

(72) Inventor: Tsuyoshi Nagao, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 18/221,605

(22) Filed: Jul. 13, 2023

(65) Prior Publication Data

US 2023/0362310 A1 Nov. 9, 2023

Related U.S. Application Data

(63) Continuation of application No. 17/700,171, filed on Mar. 21, 2022, now Pat. No. 11,743,404.

(30) Foreign Application Priority Data

Mar. 26, 2021 (JP) .................. 2021-054210
Dec. 17, 2021 (JP) .................. 2021-205361

(51) Int. Cl.
*H04N 1/00* (2006.01)
*H04N 1/32* (2006.01)

(52) U.S. Cl.
CPC ..... *H04N 1/00854* (2013.01); *H04N 1/00209* (2013.01); *H04N 1/0036* (2013.01); *H04N 1/00363* (2013.01); *H04N 1/32587* (2013.01)

(58) Field of Classification Search
None
See application file for complete search history.

(56) References Cited

U.S. PATENT DOCUMENTS

| | | |
|---|---|---|
| 9,143,940 B2 | 9/2015 | Fukushima |
| 10,754,595 B2 | 8/2020 | Sato |
| 2014/0115674 A1 | 4/2014 | Fukushima |

(Continued)

FOREIGN PATENT DOCUMENTS

| | | |
|---|---|---|
| JP | 2013-025809 A | 2/2013 |
| JP | 2014-082717 A | 5/2014 |
| JP | 2019-130747 A | 8/2019 |

OTHER PUBLICATIONS

Requirement for Restriction/Election issued on Oct. 17, 2022 for U.S. Patent Appl. No. 17/700,171.

(Continued)

*Primary Examiner* — Andrew H Lam
(74) *Attorney, Agent, or Firm* — ScienBiziP, P.C.

(57) ABSTRACT

An image processing device includes a controller, a device information generator that generates device information including identification information of the image processing device, and a job executor that executes a job at a predetermined setting based on setting information for job execution sent from a terminal device, wherein the controller displays the generated device information on the terminal device and, based on the setting information for job execution sent from the terminal device that read the displayed device information, controls the job executor to output the job at the predetermined setting.

4 Claims, 37 Drawing Sheets

(56) References Cited

U.S. PATENT DOCUMENTS

2014/0185089 A1\* 7/2014 Nuggehalli ........ H04N 1/00485
                                                    358/1.15
2017/0024173 A1\* 1/2017 Iwamoto ............... G06F 3/1292
2019/0235795 A1   8/2019 Sato

OTHER PUBLICATIONS

Non-Final Office Action issued on Jan. 5, 2023 for U.S. Appl. No. 17/700,171.
Notice of Allowance and Fee(s) Due issued on Apr. 14, 2023 for U.S. Patent Appl. No. 17/700,171.

\* cited by examiner

FIG. 3

| | DEVICE INFORMATION ITEM (KEY) | VALUE |
|---|---|---|
| I/F RELATED ITEMS | NAME | "Remote Operation" |
| | TYPE | "MFP" |
| | VERSION | "1.0" |
| MFP RELATED ITEMS | COLOR MODE | "Color output possible" |
| | PUNCH | "With options" |
| | STAPLE | "With options" |
| | OCR | "OCR possible" |
| | ⋮ | ⋮ |
| CONNECTION RELATED ITEMS | DEVICE ID | "jv6Ou3QBGv8w6yNtGt" |
| | SESSION KEY | "1qazxsw23edcvfr45tgbnhy67ujm, ki8 ----" |
| | INSTALLATION COUNTRY | "0 ~11" (example; value 3: JAPAN) |
| | ⋮ | ⋮ |

| DEVICE ID | SETTING INFORMATION |
|---|---|
| "jv6Ou3QBGv8w6yNtGt" | MODE: COPY<br>NUMBER OF COPIES: 1<br>FEED TRAY: AUTO<br>TWO-SIDED COPY: ONE-SIDED → ONE SIDED<br>180-DEGREE ROTATION OF BACK SURFACE ORIENTATION: OFF<br>COLOR MODE: COLOR<br>PUNCH: OFF<br>STAPLE: OFF |

| JOB ID | DEVICE ID | SETTING INFORMATION |
|---|---|---|
| "#0001" | "jv6Qu3QBGv8w6yNtGt" | MODE: COPY<br>NUMBER OF COPIES: 1<br>FEED TRAY: AUTO<br>TWO-SIDED COPY: ONE-SIDED → ONE SIDED<br>180-DEGREE ROTATION OF BACK SURFACE ORIENTATION: OFF<br>COLOR MODE: COLOR<br>PUNCH: OFF<br>STAPLE: OFF |

IMAGE PROCESSING DEVICE FOR DISPLAYING DEVICE INFORMATION AND EXECUTING JOBS BASED ON RECEIVED SETTING INFORMATION

The present application is a continuation application of U.S. patent application Ser. No. 17/700,171, filed on Mar. 21, 2022, which claims priority from Japanese Application 2021-054210 and 2021-205361, the content of which is hereby incorporated by reference into this application.

BACKGROUND OF THE INVENTION

Field of the Invention

The present invention relates to an image processing device, and the like.

Description of the Background Art

A multifunction peripheral capable of executing a plurality of modes, such as a print mode, a scan mode, a fax mode, and an e-mail mode, with a single device often includes an operation screen to receive the selection of a mode and the input/selection of a setting value for the selected mode.

Recently, a touch panel display including a display that presents various types of information to a user and a touch panel that is placed on the display in a superimposed manner to detect the position pressed by the user's finger has been predominately adopted as an operation screen. The user operates the touch panel while checking various types of information presented on the display so as to intuitively and easily select the mode and input/select the setting value for the selected mode.

With the outbreak of the novel coronavirus, there is an increasing demand to avoid high frequency contact with an unspecified number of people in order to reduce the risk of infection.

For example, operations via operation screens of shared multifunction peripherals in workplaces and multipurpose multifunction peripherals installed in convenience stores, etc. are no exception, and there is a need for urgent measures to avoid high frequency contact.

As an example to avoid direct contact with an operation screen of a multifunction peripheral, etc., Japanese Unexamined Patent Application Publication No. 2013-25809 discloses the technique for generating a document job without manually inputting information to a document processing device such as a multifunction peripheral terminal.

The present disclosure has an object to provide an image processing device, and the like, capable of executing a job without direct contact with an operation screen.

SUMMARY OF THE INVENTION

To solve the above disadvantage, an image processing device according to the present disclosure includes a controller, a device information generator that generates device information including identification information of the image processing device, and a job executor that executes a job at a predetermined setting based on setting information for job execution sent from a terminal device, wherein the controller displays the generated device information on the terminal device and, based on the setting information for job execution sent from the terminal device that read the displayed device information, controls the job executor to output the job at the predetermined setting.

An output system according to the present disclosure is an output system for a job including a terminal device, an image processing device, and a network service, wherein the terminal device includes a controller, and a device information acquirer that acquires device information including identification information for identifying the image processing device, and generates a user interface that receives a setting for job execution by the image processing device based on a request from the user and sends setting information for job execution set via the user interface and the acquired identification information to the network service, the network service includes a controller, and a storage that stores the setting information and the identification information in association with each other, and sends the setting information corresponding to the identification information to the image processing device in response to a request from the image processing device, and the image processing device includes a controller, a device information generator that generates the device information including the identification information of the image processing device, and a job executor that outputs the job at a predetermined setting based on the setting information, and displays the generated device information on the terminal device and, based on the setting information sent from the terminal device that read the displayed device information, controls the job executor to output the job at the predetermined setting.

A terminal device according to the present disclosure includes a controller, and a device information acquirer that acquires device information including identification information for identifying an image processing device, wherein the controller generates a user interface that receives a setting for an output method of a job by the image processing device based on a request from the user, and sends setting information set via the user interface and the acquired identification information to the network service.

An output method according to the present disclosure is an output method of a job by an image processing device, including generating device information including identification information of an image processing device, and displaying the generated device information on a terminal device and, based on setting information for job execution sent from the terminal device that read the displayed device information, outputting the job at a predetermined setting.

According to the present disclosure, it is possible to provide an image processing device, and the like, capable of executing a job without direct contact with an operation screen.

BRIEF DESCRIPTION OF THE DRAWINGS

FIG. 3 is a table illustrating a configuration example of device information.

DESCRIPTION OF THE PREFERRED EMBODIMENTS

Embodiments of the present disclosure will be described below with reference to the drawings. In the present disclosure, a multifunction peripheral 10 capable of executing either a copy mode or a scan mode is described as an example of an image processing device. The following embodiments are examples for describing the present disclosure, and the technical scope set forth in the scope of claims is not limited to the description below.

1 First Embodiment

Figure 1:
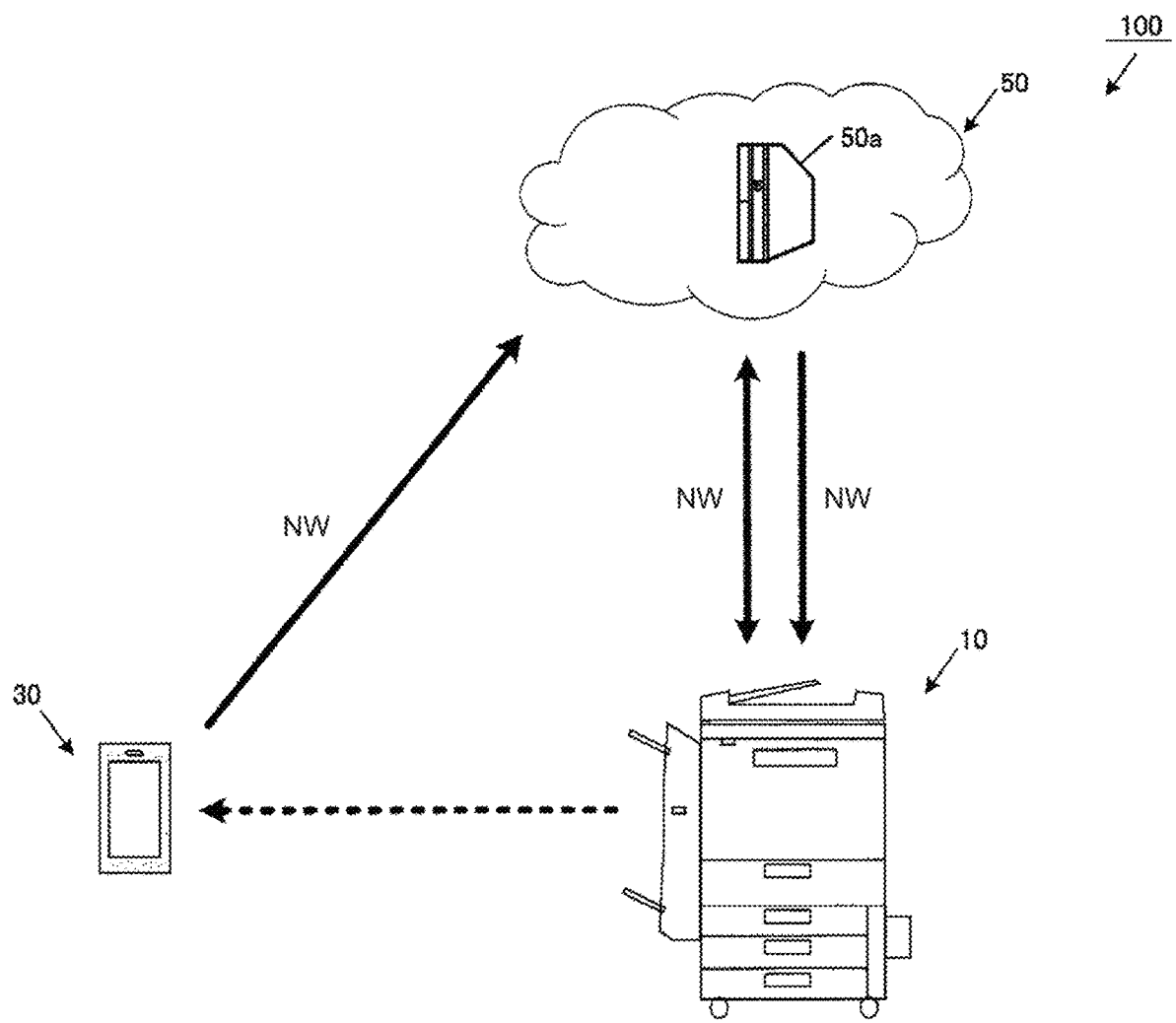
FIG. 1 is a diagram schematically illustrating an overall configuration of an output system according to a first embodiment.

FIG. 1 is a diagram schematically illustrating the overall configuration of an output system 100 according to a first embodiment. The output system 100 includes the multifunction peripheral 10, a terminal device 30, and a network service 50. In the output system 100 according to the first embodiment, an external authentication server (not illustrated), or the like, may be separately installed to perform user authentication for the multifunction peripheral 10.

The multifunction peripheral 10 is communicatively connected to the network service 50 via a network (NW) illustrated in a solid line in the figure. The terminal device 30 is communicatively connected to the network service 50 via a network (NW). The terminal device 30 is configured to acquire device information described below from the multifunction peripheral 10 (a dotted line in the FIG.).

1.1 Functional Configuration 1.1.1 About Multifunction Peripheral 10

The multifunction peripheral 10 is an image processing device that, for example, may scan a printed document and form an image on paper, which is a recording medium, and thus output a printed material. The multifunction peripheral 10 is also an image processing device that may output electronic data in a predetermined format (e.g., portable document format (PDF)) based on scan data of a printed document. The input material is not limited to printed documents but may also be electronic data input from, for example, external storage media or external devices.

Figure 2:
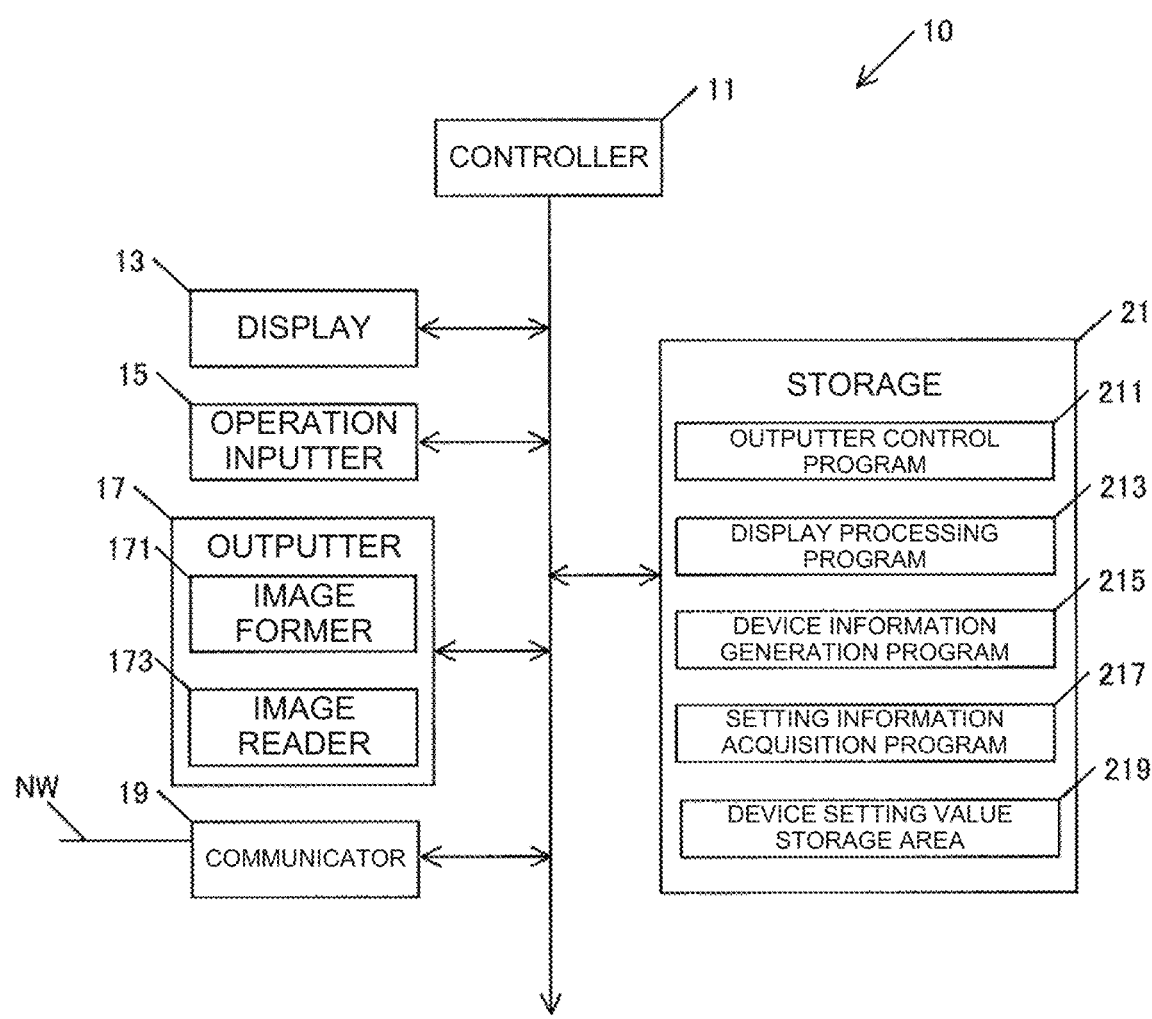
FIG. 2 is a diagram illustrating a functional configuration of a multifunction peripheral according to the first embodiment.

FIG. 2 is a diagram illustrating a functional configuration of the multifunction peripheral 10. The multifunction peripheral 10 includes a controller 11, a display 13, an operation inputter 15, an outputter 17, a communicator 19, and a storage 21.

The controller 11 controls the overall multifunction peripheral 10. The controller 11 includes one or more arithmetic devices (such as central processing units (CPUs)). The controller 11 reads and executes various programs stored in the storage 21 to perform its function.

The display 13 presents various types of information to a user, etc. The display 13 may include, for example, a liquid crystal display (LCD) or an organic electro-luminescence (EL) display. The display 13 presents device information including identification information described below.

The operation inputter 15 receives information input by the user, etc. The operation inputter 15 may include hardware keys (e.g., a numeric keypad), buttons, etc. The operation inputter 15 may be configured as a touch panel display that allows input via the display 13. In this case, examples of the input method to the touch panel display include a resistive method, infrared method, inductive method, and capacitive method.

The outputter 17 includes an image former 171 and an image reader 173. The image former 171 forms an image based on image data (image data generated by scanning a printed document or image data input from an external device) on paper, which is a recording medium, and outputs it. The image former 171 may include, for example, a laser printer using an electrophotographic system. The image former 171 forms images by using the toners supplied from toner cartridges (not illustrated) corresponding to toner colors (e.g., cyan, magenta, yellow, and black).

The image reader 173 scans and reads the printed document (document image), which is the target to be read, to generate and output image data. The image reader 173 may be configured as a scanner device including an image sensor such as a charge coupled device (CCD) or a contact image sensor (CIS). There is no limitation on the configuration of the image reader 173 as long as the image reader 173 is configured to read the reflected light image from the printed document with an image sensor and thus output image data.

The communicator 19 includes either a wired or wireless interface or both interfaces to communicate with other devices via a local area network (LAN), wide area network (WAN), the Internet, telephone line, fax line, etc.

The storage 21 stores various programs needed for the operation of the multifunction peripheral 10 and various types of data. The storage 21 may include a storage device such as a random access memory (RAM), a hard disk drive (HDD), a solid state drive (SSD), and a read only memory (ROM).

According to the first embodiment, the storage 21 stores an outputter control program 211, a display processing program 213, a device information generation program 215, and a setting information acquisition program 217 and ensures a device setting value storage area 219.

The outputter control program 211 is a program read by the controller 11 to control the outputter 17 such as the image former 171 and the image reader 173. When the controller 11 acquires the setting information described below after reading the outputter control program 211, the controller 11 controls the outputter 17 based on the setting information to perform print output by the image former 171 or image data output by the image reader 173.

The display processing program 213 is a program read by the controller 11 to perform display processing on the display 13 for, for example, the home screen and the execution screen based on each mode. After reading the display processing program 213, the controller 11 presents, on the display 13, the display screen including the device information at any time of device startup, recovery from a sleep mode, auto clear, and user login when an authentication mode is enabled. The auto clear according to the present disclosure is a process executed when a job itself is canceled or when the input or selection of a setting value is canceled. Typically, auto clear may be executed by pressing an "auto clear button" (not illustrated), or the like, provided on the display screen.

The device information generation program 215 is a program read by the controller 11 to generate the device information including the identification information of the multifunction peripheral 10. The device information according to the present disclosure includes at least items related to the settings of the multifunction peripheral 10 that are needed for inputting the setting information in the terminal device 30 and items related to the connection to the network service 50 such as the identification information of the multifunction peripheral 10 and a session key. After reading the device information generation program 215, the controller 11 generates the above information as encoded information that is encoded using one or more of a quick response (QR) code, a barcode, a symbol, and an alphanumeric. The controller 11 updates the device information on a regular or irregular basis. For example, the controller 11 may update the device information in order to correspond to a new function that is added when a driver program of the multifunction peripheral 10 is updated. Furthermore, the controller 11 updates the device information when the information about the connection to the network service 50 is updated or changed, when the installation location of the multifunction peripheral 10 is changed, etc.

Here, a configuration example of the device information according to the present disclosure will be described with reference to FIG. 3. The device information illustrated in FIG. 3 includes items such as "name", "type", and "version" as interface (I/F) related items, "color mode", "punch", "staple", "optical character recognition (OCR)", and the like, as MFP related items, and "device ID", "session key", "installation country", and the like, as connection related items, which are described in a specific format. The terminal device 30 may read and decode the encoded device information to acquire the device information. The terminal device 30 may connect to the network service 50 based on the connection related items (device ID, session key) of the acquired device information.

The device information items and their values illustrated in FIG. 3 are only examples, and the device information according to the present disclosure is not limited to the description in FIG. 3. For example, when an authentication operation for the multifunction peripheral 10 is needed for a job execution instruction by the terminal device 30, the device information may include a personal identification number (PIN), a one-time password generated by a token, etc.

With reference back to FIG. 2, the setting information acquisition program 217 is a program read by the controller 11 to acquire the setting information set in the terminal device 30 from the network service 50. After reading the setting information acquisition program 217, the controller 11 executes for example a hypertext transfer protocol secure (HTTPS) long polling communication with the network service 50 and, when a job is sent from the terminal device 30 to the multifunction peripheral 10, acquires the setting information for the job.

The device setting value storage area 219 is a storage area that stores the device setting value regarding the generation of the device information. After reading the device information generation program 215, the controller 11 reads the device setting value (e.g., "color mode", "punch", "staple", and "OCR") stored in the device setting value storage area 219 to generate the device information for the MFP related items.

1.1.2 About Terminal Device 30

The terminal device 30 according to the present disclosure may be configured as what is called a mobile terminal device, such as a smartphone, tablet, cell phone, or notebook computer. The terminal device 30 is configured as a device that has at least the function to interact with a (graphical) user interface, the function for communications, and the function specific to the mobile terminal device.

Figures 4, 5:
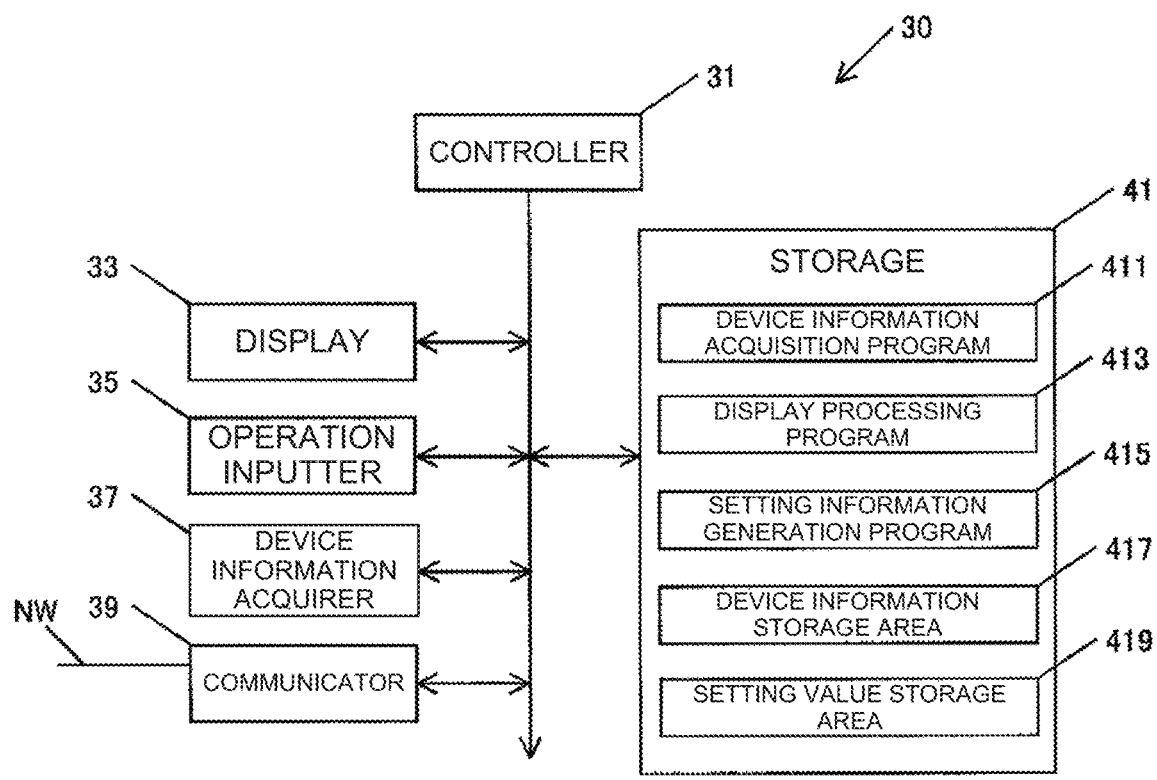
FIG. 4 is a diagram illustrating a functional configuration of a terminal device according to the first embodiment.
FIG. 5 is a table illustrating a configuration example of a combination of setting information and identification information sent by the terminal device.

FIG. 4 is a diagram illustrating a functional configuration of the terminal device 30. The terminal device 30 includes a controller 31, a display 33, an operation inputter 35, a device information acquirer 37, a communicator 39, and a storage 41.

The controller 31 controls the overall terminal device 30. The controller 31 includes, for example, one or more arithmetic devices (CPUs, etc.), and the controller 31 reads and executes various programs stored in the storage 41 to perform its function.

The display 33 presents various types of information to the user, etc. The display 33 may include, for example, an LCD and an organic EL display.

The operation inputter 35 receives information input by the user, etc. The operation inputter 35 may be configured as a touch panel display that allows input via the display 33. In this case, examples of the input method to the touch panel display include a resistive method, infrared method, inductive method, and capacitive method.

The device information acquirer 37 acquires the device information (encoded information) presented on the display 13 of the multifunction peripheral 10. Examples of the device information acquirer 37 include an imaging device such as a camera and a scanning device using a laser beam. There is no particular limitation on the configuration of the device information acquirer 37 as long as the device information acquirer 37 may acquire the device information of the multifunction peripheral 10, and may acquire the device information by using wireless communications (e.g., Wi-Fi (registered trademark), Bluetooth (registered trademark), and infrared rays). The device information acquirer 37 does not need to be directly included in the terminal device 30 but may be an external device having, for example, an imaging function, scanning function, etc.

The communicator 39 includes either a wired or wireless interface or both interfaces to communicate with other devices via a LAN, WAN, the Internet, telephone line, etc.

The storage 41 stores various programs needed for operations of the terminal device 30 and various types of data. The storage 41 may include a storage device such as a RAM, HDD, SSD, and ROM.

According to the first embodiment, the storage 41 stores a device information acquisition program 411, a display processing program 413, and a setting information generation program 415 and ensures a device information storage area 417 and a setting value storage area 419.

The device information acquisition program 411 is a program read by the controller 11 to acquire the device information of the multifunction peripheral 10. After reading the device information acquisition program 411, the controller 31 controls the device information acquirer 37 to acquire the device information.

The display processing program 413 is a program read by the controller 31 to present, on the display 33, a user interface, and the like, which receives the selection of a job mode to be executed by the multifunction peripheral 10 and the input and selection of a setting value.

The setting information generation program 415 is a program read by the controller 31 to generate the setting information based on the setting value input and selected via the user interface presented on the display 33. After reading the setting information generation program 415, the controller 31 generates the setting information from various setting values that are input and selected via the user interface and stored in the setting value storage area 419. Then, the controller 31 sends the generated setting information together with the identification information (device ID) of the multifunction peripheral 10 to the network service 50.

Here, FIG. 5 is a table illustrating a configuration example of a combination of the setting information and the identification information (device ID) sent by the terminal device 30 to the network service 50. FIG. 5 illustrates an example of sending of the combination of the setting information including a group of "mode", "number of copies", "feed tray", "two-sided copy", "180-degree rotation of back surface orientation", "color mode", "punch", and "staple" input and selected via the user interface and "jv6Ou3QBGv8w6yNtGt" as the identification information (device ID) of the multifunction peripheral 10.

With reference back to FIG. 4, the device information storage area 417 is a storage area for storing the device information acquired from the multifunction peripheral 10. The setting value storage area 419 is a storage area for storing the setting value input and selected by the user via the user interface.

1.1.3 About Network Service 50

The network service 50 is a computing system, what is called a cloud, which provides a predetermined service such as processing resources, storage resources, and delivery resources through, for example, a web browser. The service provided by the network service 50 may be used by using any data communication protocol such as a transfer control protocol, Internet protocol, and other protocols and accessing from the multifunction peripheral 10 or the terminal device 30 via the network (NW). The network service 50 includes one or more network devices 50a as hardware. In the following description, when no special hardware configuration is described, the network service 50 will be simply referred to.

Figures 6, 7:
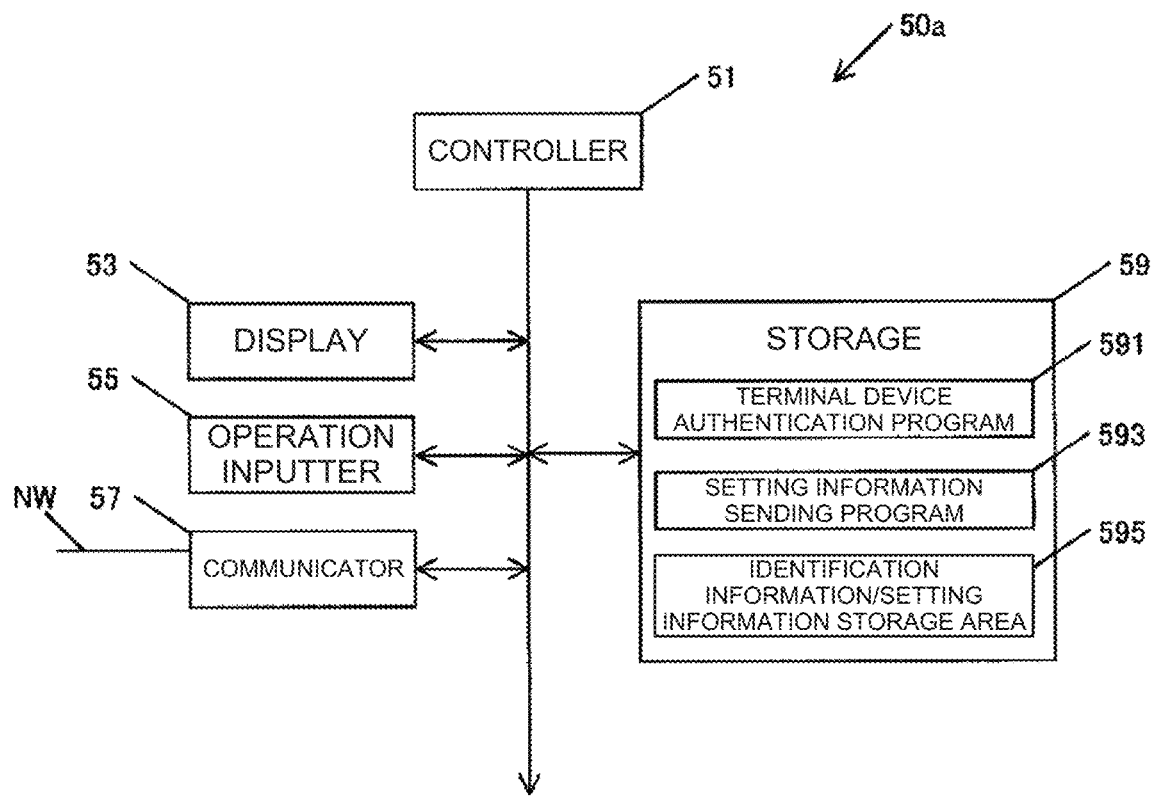
FIG. 6 is a diagram illustrating a functional configuration of a network service according to the first embodiment.
FIG. 7 is a table illustrating a configuration example of a combination of setting information and identification information stored by the network service.

FIG. 6 is a diagram illustrating a functional configuration of the network device 50a included in the network service 50. The network device 50a includes a controller 51, a display 53, an operation inputter 55, a communicator 57, and a storage 59.

The controller 51 controls the overall network service 50. The controller 51 includes, for example, one or more arithmetic devices (CPUs, etc.), and the controller 51 reads and executes various programs stored in the storage 59 to perform its function.

The display 53 presents various types of information to the user, etc. The display 53 may include, for example, an LCD and an organic EL display.

The operation inputter 55 receives information input by the user, etc. An input device such as a keyboard and a mouse may be used as the operation inputter 55.

The communicator 57 includes either a wired or wireless interface or both interfaces to communicate with other devices via a LAN, WAN, the Internet, telephone line, etc.

The storage 59 stores various programs needed for operations of the network service 50 and various types of data. The storage 59 may include a storage device such as a RAM, HDD, SSD, and ROM.

According to the first embodiment, the storage 59 stores a terminal device authentication program 591 and a setting information sending program 593 and ensures an identification information/setting information storage area 595.

The terminal device authentication program 591 is a program read by the controller 51 to authenticate the connection with the terminal device 30. After reading the terminal device authentication program 591, the controller 51 authenticates the connection with the terminal device 30 based on the session key sent together when the identification information and the setting information are sent from the terminal device 30.

The setting information sending program 593 is a program read by the controller 51 to send the setting information to the multifunction peripheral 10. After reading the setting information sending program 593, the controller 51 searches for the job ID attached to the identification information (device ID) on the multifunction peripheral 10 in response to the HTTPS long polling from the multifunction peripheral 10. When the setting information is associated with the job ID, the connection is established with the multifunction peripheral 10 and the setting information is sent.

As illustrated in FIG. 7, the identification information/setting information storage area 595 is a storage area in which the controller 51 associates the identification information with the setting information of the multifunction peripheral 10 sent from the terminal device 30, then attaches the job ID to them, and stores them. The controller 51 uses the job ID to manage the information in which the identification information (device ID) is associated with the setting information. The job ID may also be assigned by the terminal device 30. In this case, the terminal device 30 may associate the identification information with the setting information of the multifunction peripheral 10, then attach the job ID to them, and send them to the network service 50. The controller 51 stores the identification information and the setting information of the multifunction peripheral 10 with the job ID attached thereto in the identification information/setting information storage area 595.

1.2 Process Flow 1.2.1 Overall Process

Figure 8:
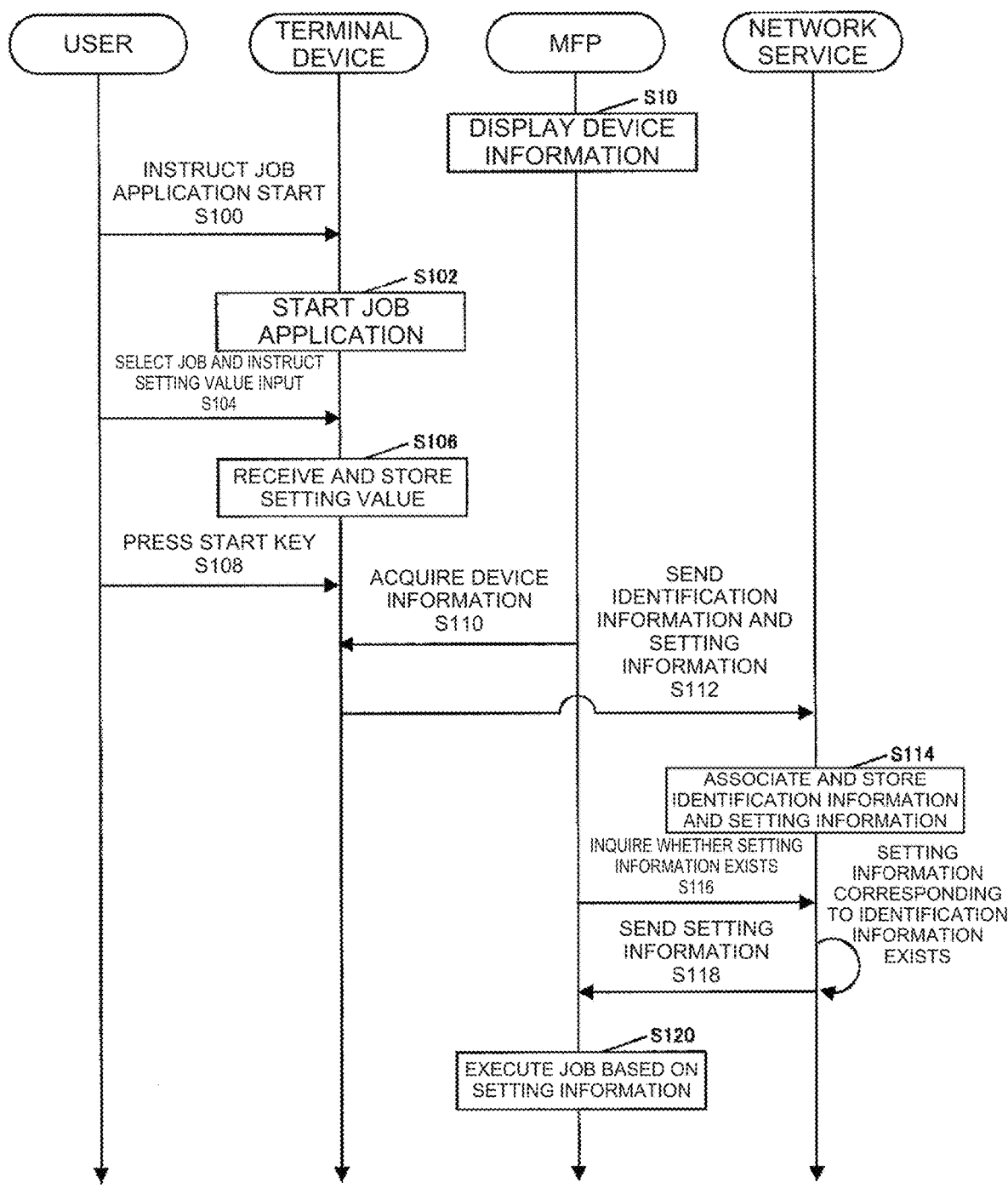
FIG. 8 is a flowchart illustrating an overall process according to the first embodiment.

Next, the overall process according to the first embodiment will be described using the flowchart in FIG. 8. First, the multifunction peripheral 10 presents, on the display 13, the display screen including the device information at any time of device startup, recovery from the sleep mode, auto clear, and user login when the authentication mode is enabled (Step S10).

The user sets the (printed) document in the multifunction peripheral 10 and inputs the instruction for starting the job application in the terminal device 30 (Step S100). The terminal device 30 starts the job application in response to the instruction for starting the job application (Step S102).

The user selects the job to be executed by the multifunction peripheral 10 via the user interface presented on the display 33 and inputs and selects the setting value for the selected job (Step S104).

The terminal device 30 receives the setting value for which the input instruction has been received and stores the setting value in the setting value storage area 419 (Step S106).

The user presses the start key (Step S108). After the start key is pressed, the controller 31 of the terminal device 30 reads the device information acquisition program 411 to acquire the device information presented on the display 13 of the multifunction peripheral 10 (Step S110).

The terminal device 30 generates the setting information from various setting values stored in the setting value storage area 419 and sends the setting information to the network service 50 together with the identification information of the multifunction peripheral 10 (Step S112).

The network service 50 associates the identification information with the setting information of the multifunction peripheral 10 sent from the terminal device 30 and then attaches the job ID thereto, and stores them in the identification information/setting information storage area 595 (Step S114).

The multifunction peripheral 10 executes HTTPS long polling with the network service 50 and inquires whether the setting information corresponding to the identification information of the multifunction peripheral 10 exists (Step S116).

When the setting information corresponding to the identification information of the multifunction peripheral 10 exists, the network service 50 establishes a connection with the multifunction peripheral 10 and sends the setting information (Step S118).

The multifunction peripheral 10 executes the job based on the received setting information (Step S120).

1.2.2 About Process of Multifunction Peripheral 10

Figure 9:
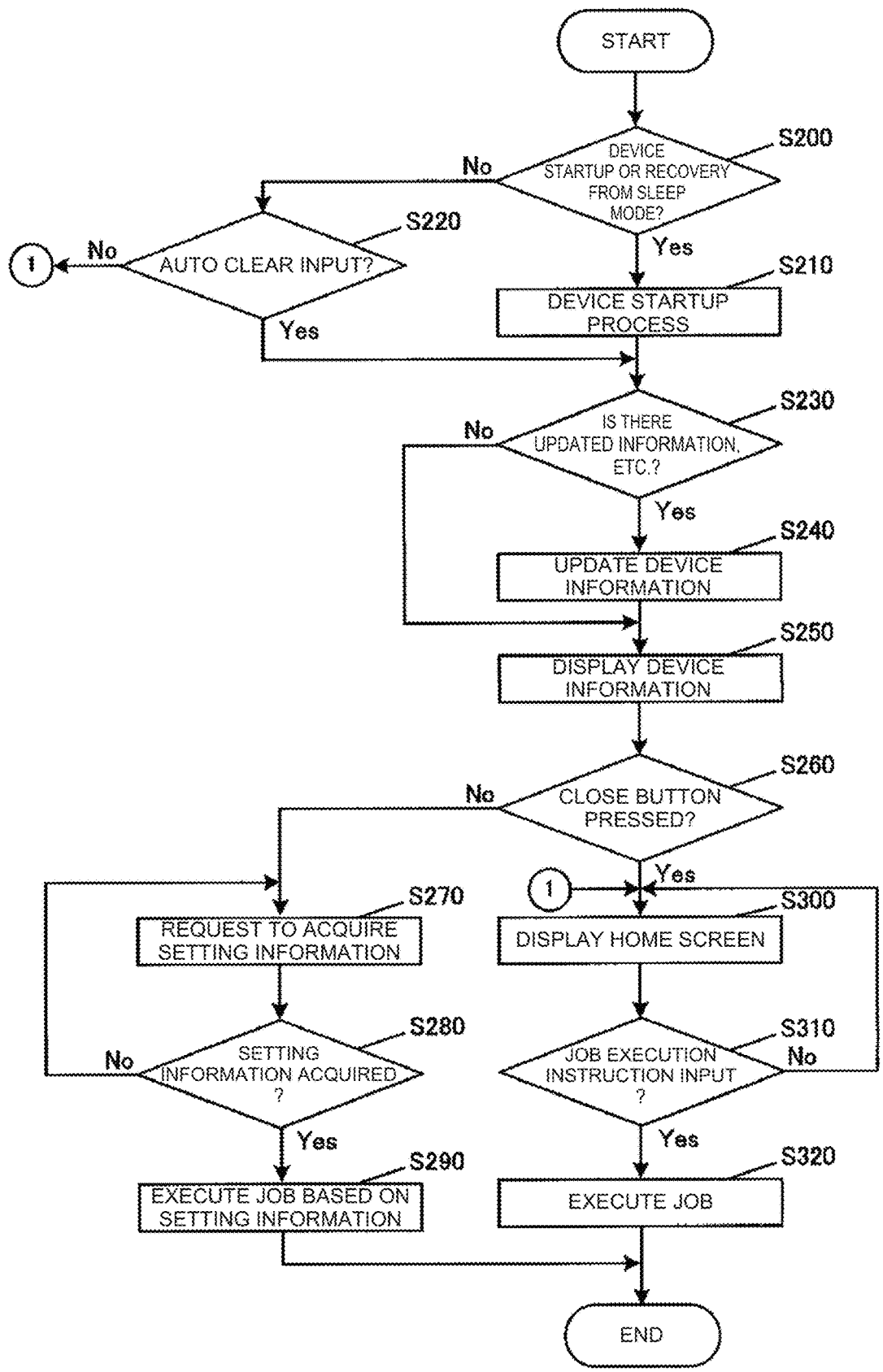
FIG. 9 is a flowchart illustrating a process of a multifunction peripheral according to the first embodiment.

Next, the process of the multifunction peripheral 10 will be described using the flowchart in FIG. 9. The controller 11 of the multifunction peripheral 10 determines whether the device status is device startup or recovery from the sleep mode (Step S200).

When it is determined that it is device startup or recovery from the sleep mode, the controller 11 performs a device startup process (Step S200; Yes→Step S210).

Conversely, when it is determined that it is not device startup or recovery from the sleep mode, the controller 11 determines whether it is the input of auto clear (Step S200; No→Step S220).

When it is determined that it is the input of auto clear, the controller 11 proceeds to the process at Step S230 (Step S220; Yes→Step S230). Conversely, when it is determined that it is not the input of auto clear, the controller 11 proceeds to the process at Step S300.

After the device startup process at Step S210, the controller 11 determines whether, for example, the driver program, information about the connection to the network service 50, etc. have been updated (Step S230). When there is updated information, etc., the controller 11 reads the device information generation program 215 to update the device information based on the updated information (Step S230; Yes→Step S240).

Then, the controller 11 reads the display processing program 213 to present the display screen including the device information updated at Step S230 on the display 13 (Step S250).

Conversely, when there is no updated information, etc., the controller 11 does not update the device information, but presents the device information on the display 13 (Step S230; No→Step S250).

Subsequently, the controller 11 determines whether a "close button" provided on the display screen including the device information has been pressed (Step S260). When the "close button" has not been pressed, the controller 11 makes a request to acquire the setting information (Step S260; No→Step S270). Specifically, the controller 11 reads the setting information acquisition program 217 to perform an HTTPS polling communication with the network service 50. The HTTPS polling communication with the network service 50 may be performed before the pressing of the "close button" for Step S260 is received, and for example may be performed continuously after the device startup process at Step S210.

Then, the controller 11 determines whether the setting information has been acquired (Step S280). After acquiring the setting information from the network service 50, the controller 11 executes the job based on the acquired setting information and ends the process (Step S280; Yes→Step S290). When no setting information is acquired from the network service 50 for a certain period of time after the user login while the authentication mode is enabled, the controller 11 may automatically perform a logout process. Thus, automatic logout may prevent unauthorized use when an unattended state such as a non-operating state continues while user authentication is enabled.

When the "close button" is pressed, the controller 11 displays the home screen (Step S260; Yes→Step S300). In this case, the controller 11 does not output a job based on the setting information sent from the terminal device 30 and acquired via the network service 50.

Then, the controller 11 determines whether the instruction for executing a job has been received via the home screen (Step S310). When it is determined that the instruction for executing a job has been input by the user via the home screen, the controller 11 executes the job and ends the process (Step S310; Yes→Step S320).

1.2.3 About Process of Terminal Device 30

Next, the process of the terminal device 30 will be described using the flowchart in FIG. 10. The controller 31 of the terminal device 30 determines whether the instruction for starting the job application has been received from the user (Step S400).

When it is determined that the instruction for starting the job application has been received, the controller 31 reads the display processing program 413 to present the application screen as a user interface on the display 33 (Step S400; Yes→Step S410).

Subsequently, the controller 31 determines whether a copy job has been selected by the user via the application screen (Step S420). When it is determined that a copy job has been selected by the user, the controller 31 displays a copy job execution screen on the display 33 (Step S420; Yes→Step S430). Conversely, when it is determined that a copy job has not been selected by the user, the controller 31 displays a scan job execution screen on the display 33 (Step S420; No→Step S440).

The controller 31 receives the input of a setting value via either the copy job execution screen displayed at Step S430 or the scan job execution screen displayed at Step S440 (Step S450). Then, the controller 31 stores the received setting value in the setting value storage area 419 (Step S460).

The controller 31 determines whether the "start button" has been pressed by the user (Step S470). When it is determined that the "start button" has been pressed by the user, the controller 31 acquires the device information from the multifunction peripheral 10 (Step S470; Yes→Step S480a). Specifically, after the start key is pressed, the controller 31 reads the device information acquisition program 411 to acquire the device information presented on the display 13 of the multifunction peripheral 10 (Step S480a).

Subsequently, the controller 31 reads the setting information generation program 415 to generate the setting information from various setting values stored in the setting value storage area 419 (Step S480b). Then, the controller 31 sends the generated setting information to the network service 50 together with the identification information of the multifunction peripheral 10 and ends the process (Step S490).

1.2.4 About Process of Network Service 50

Figure 11:
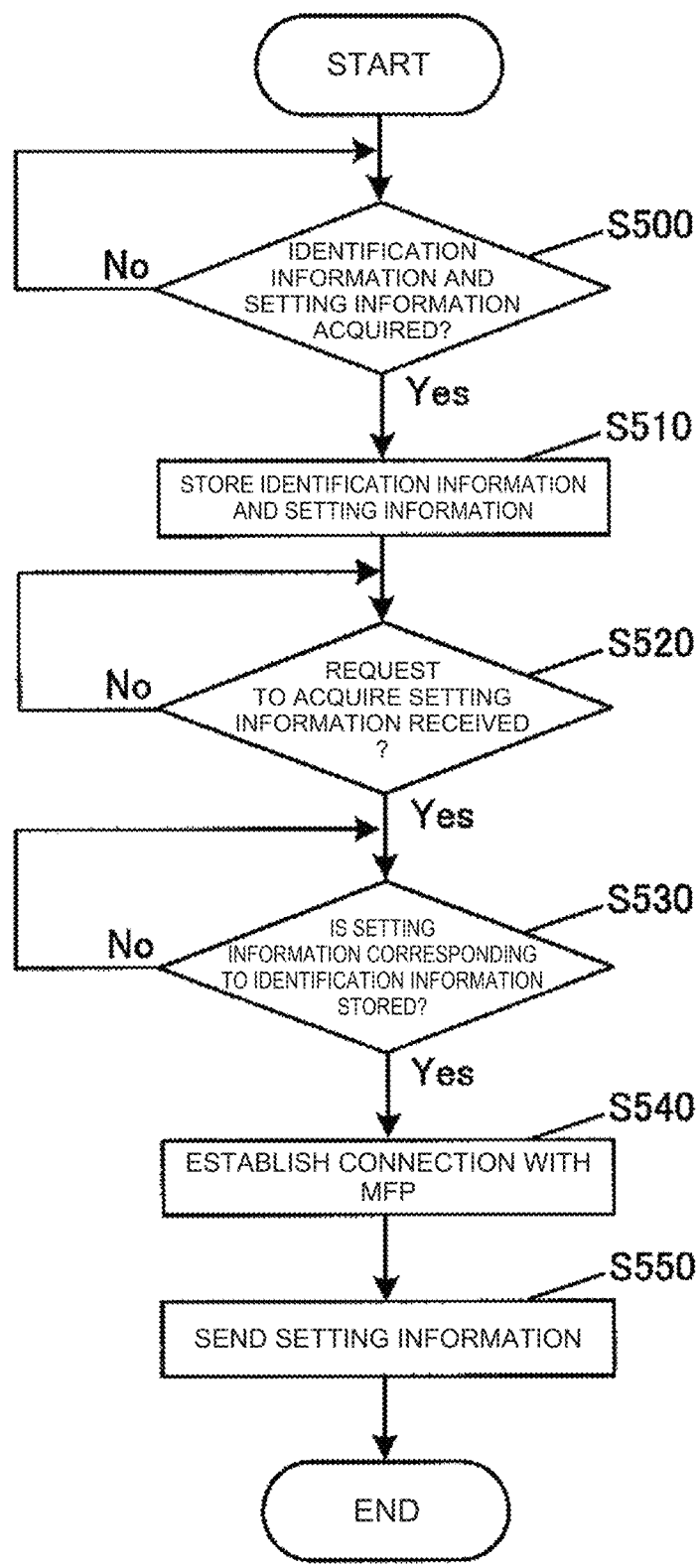
FIG. 11 is a flowchart illustrating a process of the network service according to the first embodiment.

Next, the process of the network service 50 will be described using the flowchart in FIG. 11. The controller 51 of the network service 50 determines whether the identification information and the setting information have been acquired from the terminal device 30 (Step S500). In this case, the controller 51 may read the terminal device authentication program 591 and determines whether the identification information and the setting information have been acquired depending on whether the connection with the terminal device 30 has been authenticated.

When it is determined that the identification information and the setting information have been acquired from the terminal device 30, the controller 51 associates the identification information and the setting information and then attaches the job ID thereto, and stores them in the identification information/setting information storage area 595 (Step S500; Yes→Step S510).

Subsequently, the controller 51 determines whether a request to acquire the setting information has been received from the multifunction peripheral 10 (Step S520). When it is determined that a request to acquire the setting information has been received from the multifunction peripheral 10, the controller 51 determines whether the setting information corresponding to the identification information of the multifunction peripheral 10 is stored (Step S520; Yes→Step S530). In this case, the controller 51 searches for the job ID attached to the identification information (device ID) of the multifunction peripheral 10 in response to an HTTPS long polling from the multifunction peripheral 10. When the setting information is associated with the job ID, the controller 51 determines that the setting information corresponding to the identification information of the multifunction peripheral 10 is stored.

When the setting information corresponding to the identification information is stored, the controller 51 establishes a connection with the multifunction peripheral 10 (Step S530; Yes→Step S540). Then, the controller 51 reads the setting information sending program 593 to send the setting information as a job to the multifunction peripheral 10 and ends the process (Step S550).

1.3 Operation Example

Figure 12:
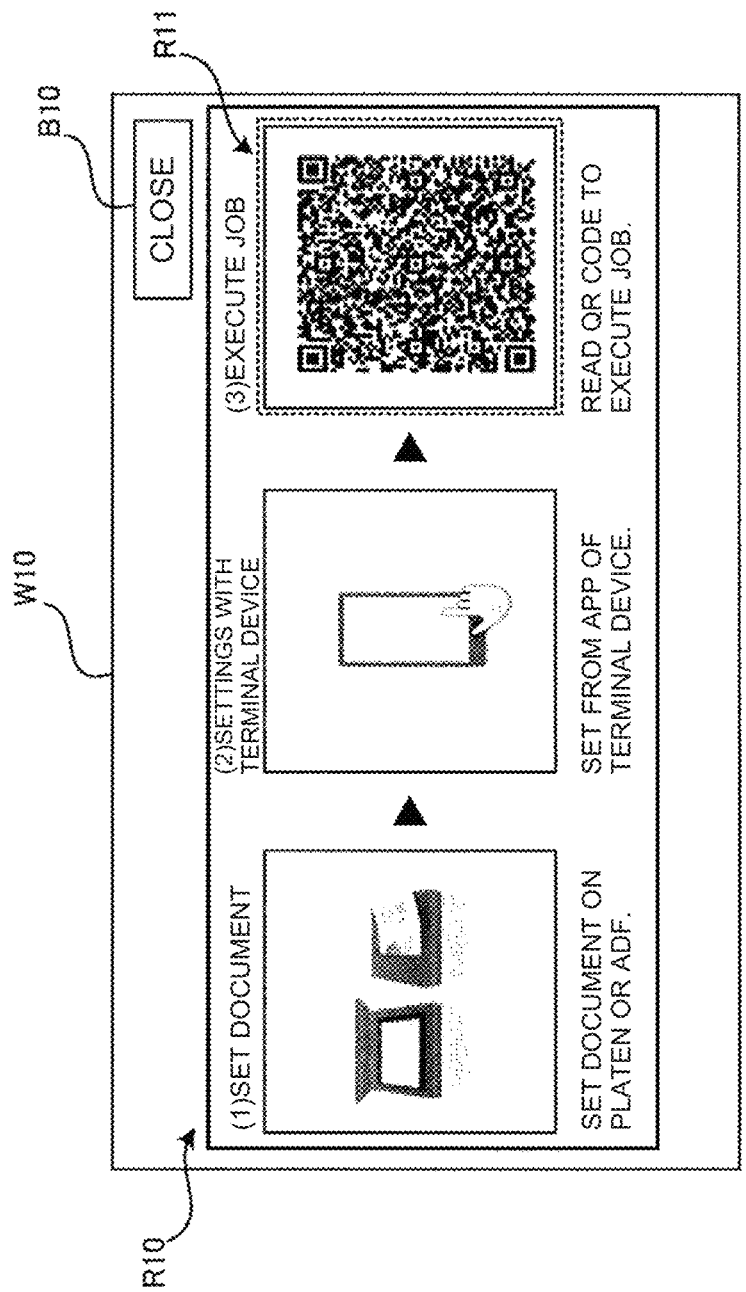
FIG. 12 is a diagram illustrating a configuration example of a display screen displayed by the multifunction peripheral.

Next, an operation example according to the first embodiment will be described. FIG. 12 illustrates a configuration example of a display screen W10 that is presented on the display 13 by the multifunction peripheral 10. This operation example corresponds to the process at Step S250 in FIG. 9, and the display screen W10 is displayed at any time of device startup, recovery from the sleep mode, auto clear, and user login when the authentication mode is enabled.

The display screen W10 includes an operation procedure display area R10 and a close button B10. The operation procedure display area R10 is an area for describing the operation procedure of the output method according to the first embodiment through illustrations or animations. In the example illustrated in FIG. 12, the operation procedure is described in the following order: (1) set a document, (2) settings with the terminal device, and (3) execute a job.

The operation procedure display area R10 includes a device information display area R11 that displays the device information of the multifunction peripheral 10. In the example described according to the first embodiment, a quick response (QR) code is used as encoded information representing the device information. The QR code (registered trademark) is a two-dimensional code representing data in a graphical form. In addition to the QR code, information encoded using one or more of a barcode, a symbol, and an alphanumeric may also be used as the device information.

The terminal device 30 may read the QR code with an imaging device such as a camera or a scanning device using a laser light to execute a job.

The close button B10 is a button that is pressed when the user desires to execute a job via the normal home screen without using the output method according to the present disclosure. When the close button B10 is pressed, the controller 11 presents the home screen described in the subsequent figure on the display 13.

Figure 13:
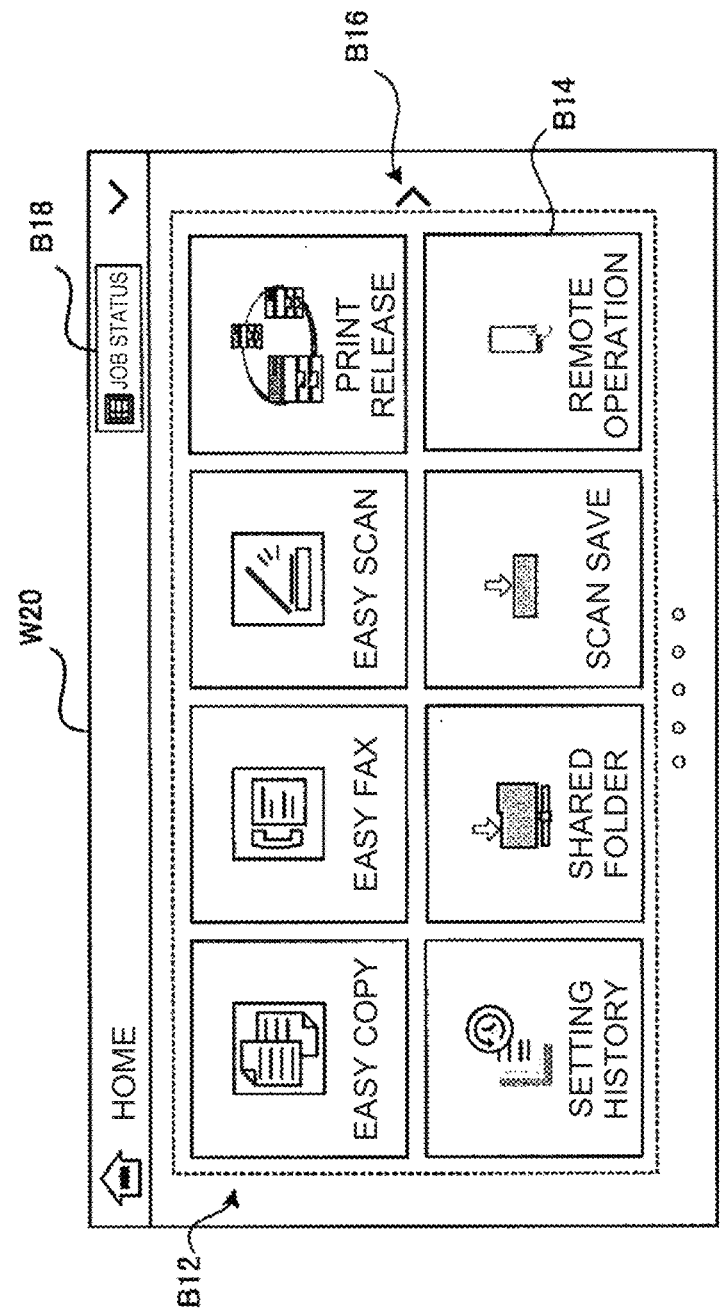
FIG. 13 is a diagram illustrating a configuration example of a home screen displayed by the multifunction peripheral.

FIG. 13 illustrates a configuration example of a home screen W20 according to the first embodiment. This operation example corresponds to the process at Step S300 of FIG. 9. The home screen W20 is, for example, a basic screen that receives the user's selection of a job and selection of various function displays. The home screen W20 includes a job/function selection button B12, a display forward button B16, and a job status button B18.

The job/function selection button B12 receives the selection of the job, function display, etc., desired by the user. For example, when the user presses an "easy copy" button on the job/function selection button B12, the controller 11 displays a job execution screen (not illustrated) for setting the "easy copy". The job/function selection button B12 according to the first embodiment also includes a remote operation button B14 to shift the screen to the display screen W10 illustrated in FIG. 12. When the user presses the remote operation button B14, the controller 11 shifts the screen display to the display screen W10 so as to enable the use of the output method according to the present disclosure. The display configuration example of the job/function selection button B12 in FIG. 13 is only an example, and job and function display buttons that are not displayed may be displayed by pressing the display forward button B16.

The job status button B18 receives an instruction input for notifying the progress status of the job executed by the multifunction peripheral 10, the reservation status, etc. When the user presses the job status button B18, the controller 11 presents the progress status of the job, the reservation status, etc., which are not illustrated.

Figure 14:
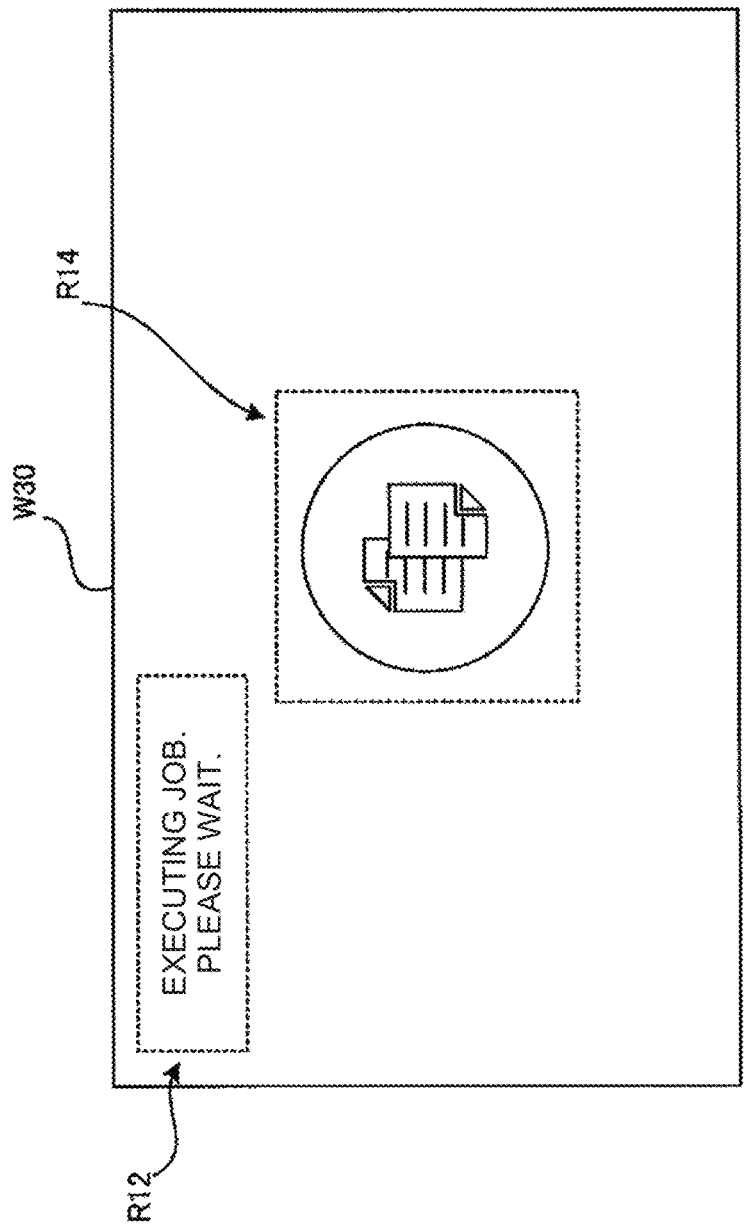
FIG. 14 is a diagram illustrating a configuration example of a job execution screen displayed by the multifunction peripheral.

FIG. 14 illustrates a configuration example of an execution screen presented on the display 13 when the multifunction peripheral 10 has received the setting information from the network service 50 and is executing the job based on the setting information. This operation example corresponds to the process at Step S290 of FIG. 9. An execution screen W30 includes a message display area R12 indicating that the job is being executed and an execution job display area R14 displaying the type of job being executed (copy job in the example of FIG. 14) by an illustration or animation.

Figure 15:
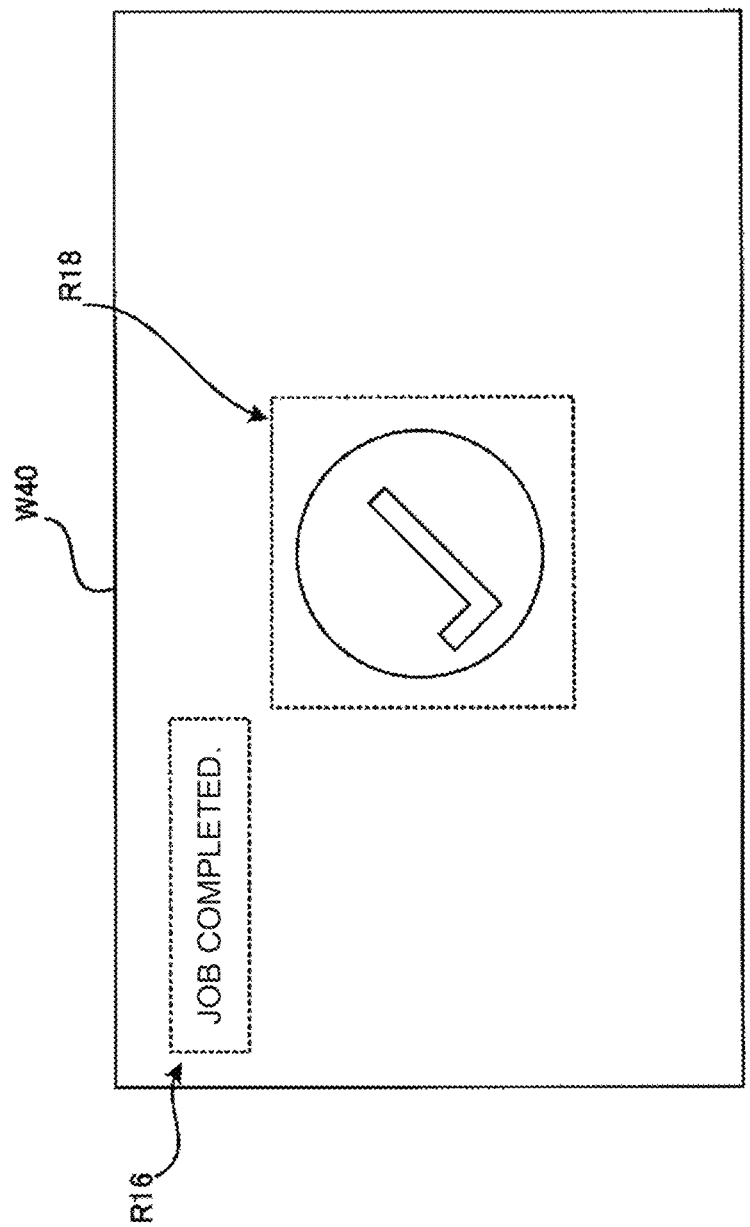
FIG. 15 is a diagram illustrating a configuration example of a job completion screen displayed by the multifunction peripheral.

FIG. 15 illustrates a configuration example of a completion screen presented on the display 13 when the multifunction peripheral 10 has completed the job. This operation example corresponds to the process after Step S290 in FIG. 9. A completion screen W40 includes a message display area R16 indicating that the job has been completed and a completion job display area R18 displaying the completion of the job by illustration or animation.

Figure 16:
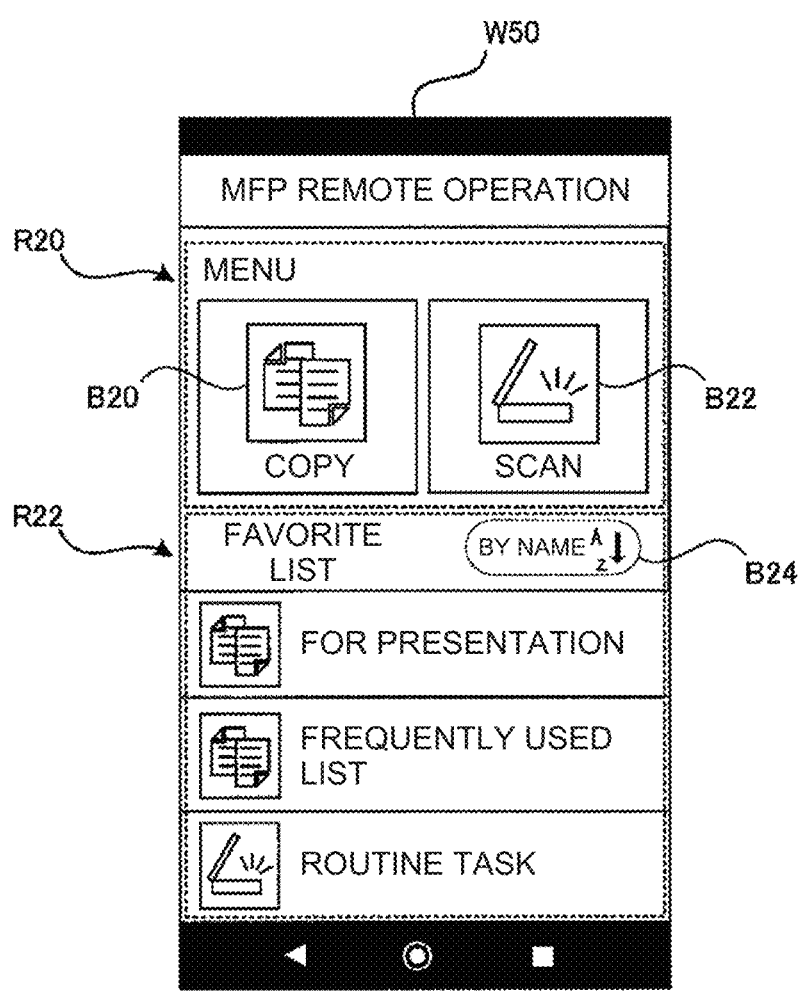
FIG. 16 is a diagram illustrating a configuration example of an application screen displayed by the terminal device.

FIG. 16 illustrates a configuration example of an application screen that is presented on the display 33 after the instruction for starting the job application is received from the user. This operation example corresponds to the process from Step S400 to Step S410 in FIG. 10. An application screen W50 includes a menu display area R20 and a favorite list display area R22.

The menu display area R20 includes a copy job selection button B20 and a scan job selection button B22. The copy job selection button B20 receives the user's selection of a copy job. When the pressing of the copy job selection button B20 is received, the controller 31 may determine that the copy job has been selected by the user. When the pressing of the copy job selection button B20 is received, the controller 31 displays the copy job execution screen on the display 33.

Conversely, the scan job selection button B22 receives the user's selection of a scan job. When the pressing of the scan job selection button B22 is received, the controller 31 may determine that the scan job has been selected by the user. When the pressing of the scan job selection button B22 is received, the controller 31 displays the scan job execution screen on the display 33.

The favorite list display area R22 displays items that are frequently used by the user in a list format. The ascending and descending order display of the favorite list may be switched by a sort button B24.

Figure 17:
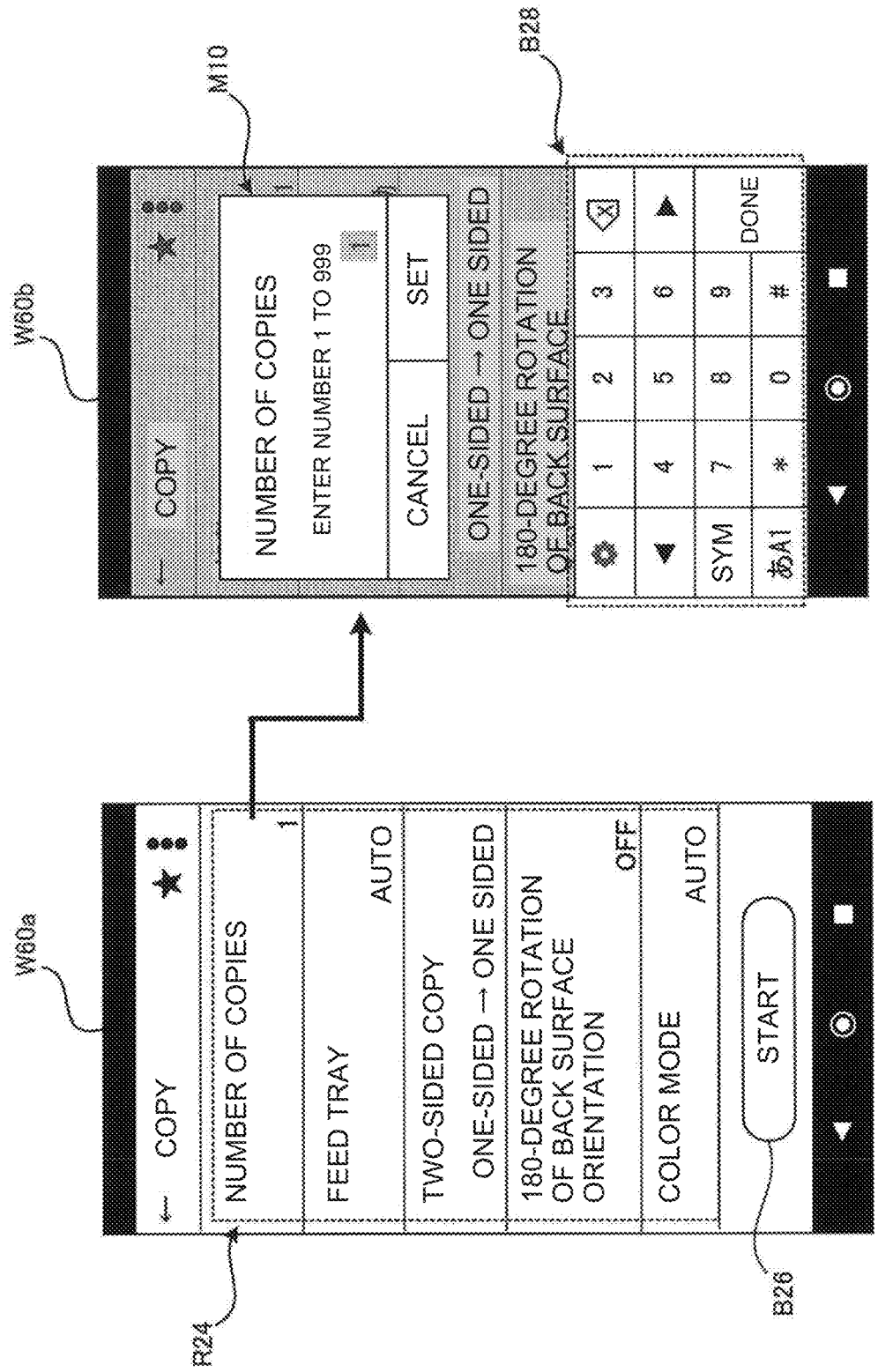
FIG. 17 is a diagram illustrating a configuration example of a copy job execution screen displayed by the terminal device.

FIG. 17 illustrates a configuration example of the copy job execution screen presented on the display 33 when the copy job is selected by the user. This operation example corresponds to the process at Step S420, S430, and S450 of FIG. 10. A copy job execution screen W60a includes a setting value setting area R24 and a start button B26.

The setting value setting area R24 receives the input and selection of the setting value for job execution. The setting value may be input and selected as each setting value for a copy job, such as "number of copies", "feed tray", "two-sided copy", "180-degree rotation of back surface orientation", and "color mode".

For example, a copy job execution screen W60b is a configuration example of a number of copies setting screen that is displayed when the setting value of "number of copies" is selected by a tap operation, etc. The copy job execution screen W60b includes a modal M10 that receives the input of the setting value of the number of copies and a setting value input button B28.

As illustrated in FIG. 17, when the modal M10 is displayed, the controller 31 displays other setting values in gray and puts a restriction so as not to input the setting value. The user inputs the number of copies by using the setting value input button B28. After the predetermined number of copies is input, a "set" button is pressed so that the setting value for the number of copies may be confirmed. When the "set" or "cancel" button is pressed, the screen returns to the copy job execution screen W60a.

Figure 18:
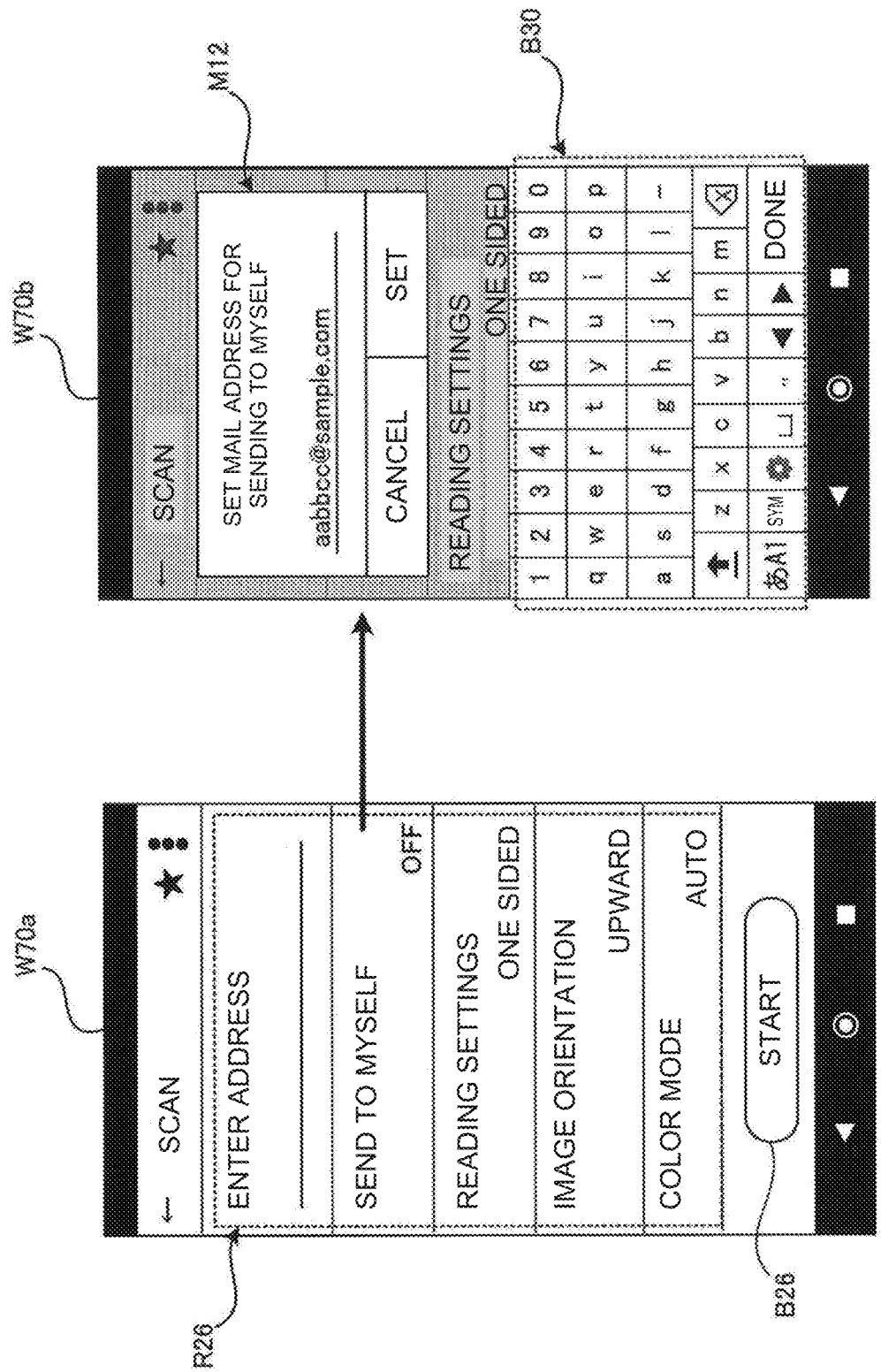
FIG. 18 is a diagram illustrating a configuration example of a scan job execution screen displayed by the terminal device.

FIG. 18 illustrates a configuration example of the scan job execution screen displayed on the display 33 when the scan job is selected by the user. This operation example corresponds to the process at Steps S420, S440, and S450 of FIG. 10. A scan job execution screen W70a includes a setting value setting area R26 and the start button B26.

The setting value setting area R26 receives the input and selection of the setting value for job execution. The setting value may be input and selected as each setting value for the scan job, such as "enter address", "send to myself", "reading settings", "image orientation", and "color mode".

For example, a scan job execution screen W70b is a configuration example of a destination setting screen for sending to myself that is displayed when the setting value of "send to myself" is selected by a tap operation, etc. as the setting value. The scan job execution screen W70b includes a modal M12 that receives input of the setting value for sending to myself and a setting value input button B30.

As illustrated in FIG. 18, when the modal M12 is displayed, the controller 31 displays other setting values in gray and puts a restriction so as not to input the setting value. The user uses the setting value input button B30 to input the sending destination for sending to myself. After the predetermined sending destination is input, a "set" button is pressed so that the setting value for the sending destination may be confirmed. When the "set" or "cancel" button is pressed, the screen returns to the scan job execution screen W70a.

Figure 19:
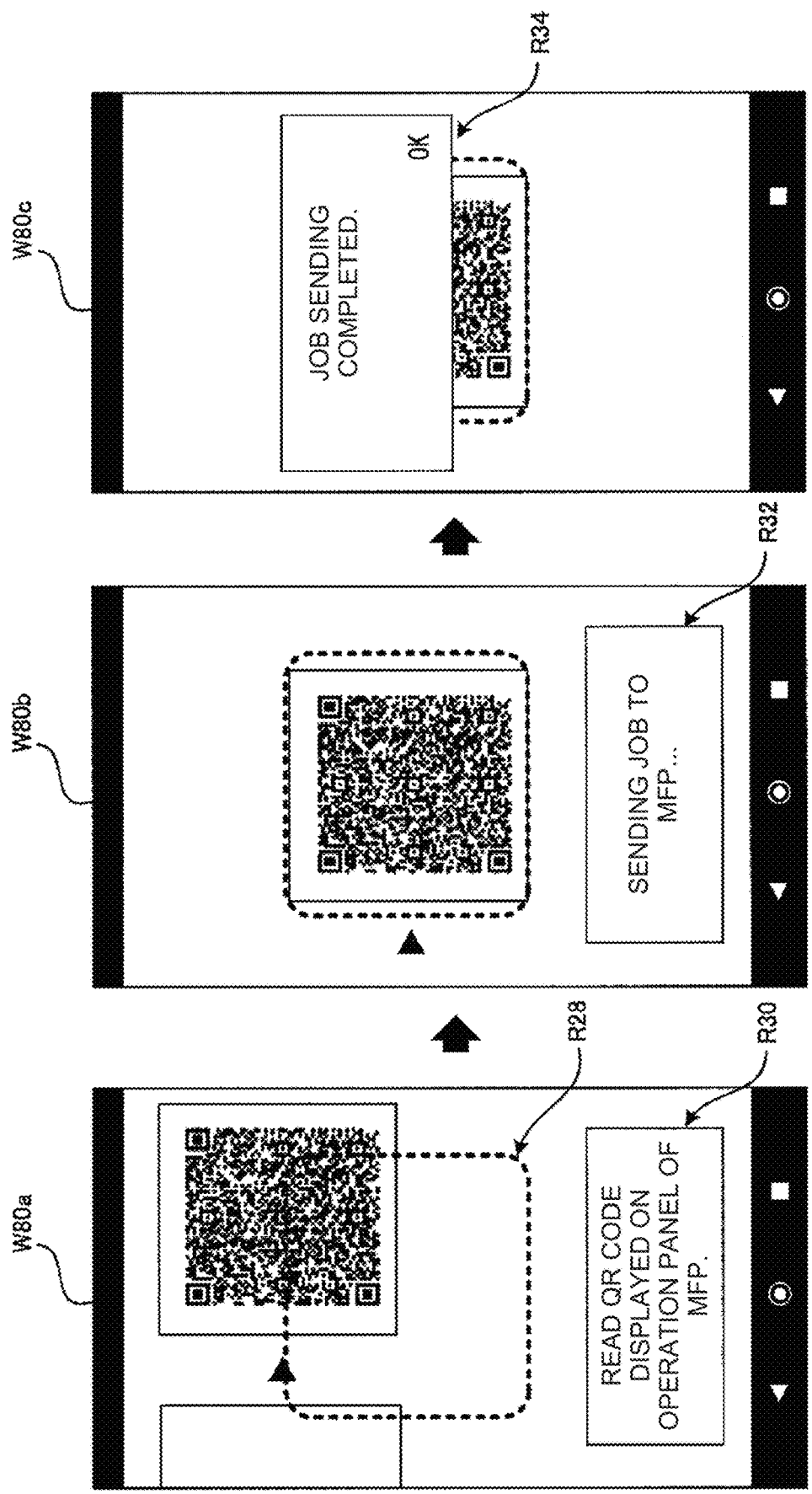
FIG. 19 is a diagram illustrating a configuration example of a device information acquisition screen displayed by the terminal device.

FIG. 19 illustrates a configuration example of a device information acquisition screen displayed by the controller 31 to acquire the device information that is being displayed in the multifunction peripheral 10 after the start button B26 is pressed on the copy job execution screen W60a in FIG. 17 or the scan job execution screen W70a in FIG. 18. A device information acquisition screen W80a includes a device information acquisition area R28 and a status display area R30.

As illustrated in FIG. 19, the device information acquisition area R28 may be configured as a guideline to guide the user such that, when the device information to be acquired is encoded information such as a QR code, the encoded information falls within a reading area of the imaging device or the scanning device. The user operates the terminal device 30 such that the encoded information such as a QR code falls within the device information acquisition area R28. When the device information is acquired, the controller 31 shifts the device information acquisition screen W80a to a device information acquisition screen W80b.

The status display area R30 is an area for displaying the progress status (status) of the operation or job to the user. For example, the status display area R30 of the device information acquisition screen W80a is an example of displaying a message indicating that the QR code is to be read while the QR code falls within the device information acquisition area R28.

After the encoded information such as the QR code is read, a status display area R32 on the device information acquisition screen W80b displays a message indicating that the job (setting information) is being sent to the multifunction peripheral 10.

After the sending of the job to the multifunction peripheral 10 is completed, the controller 31 shifts the display screen to a device information acquisition screen W80c. On the device information acquisition screen W80c, a status display area R34 displays a message indicating that the sending of the job is completed.

As described above, according to the first embodiment, the setting value for the job to be executed by the image processing device may be set on the terminal device, and therefore the job may be executed without direct contact with the operation screen of the image processing device.

2 Second Embodiment

According to the first embodiment, the device information is acquired after the setting information is set. A second embodiment differs from the first embodiment in that the setting information is set after the device information is acquired.

A functional configuration according to the second embodiment may be the same as that in the first embodiment. Therefore, the same configuration as that in the first embodiment is denoted by the same reference numeral, and the description thereof is omitted.

The process of the multifunction peripheral 10 and the process of the network service 50 may be the same as those in the first embodiment, and therefore the description here is omitted.

The process of the terminal device 30 will be described using the flowchart in FIG. 20. The controller 31 of the terminal device 30 determines whether the instruction for starting the job application has been received from the user (Step S600). When it is determined that the instruction for starting the job application has been received, the controller 31 reads the display processing program 412 to display the application screen as a user interface on the display 33 (Step S600; Yes→Step S610).

The controller 31 acquires the device information from the multifunction peripheral 10 (Step S680a).

Subsequently, the controller 31 determines whether a copy job has been selected by the user via the application screen (Step S620). When it is determined that a copy job has been selected by the user, the controller 31 displays the copy job execution screen on the display 33 (Step S620; Yes→Step S630). Conversely, when it is determined that a copy job has not been selected by the user, the controller 31 displays the scan job execution screen on the display 33 (Step S620; No→Step S640).

The controller 31 receives the input of the setting value via either the copy job execution screen displayed at Step S630 or the scan job execution screen displayed at Step S640 (Step S650). Here, based on the device information acquired at Step S680a, the controller 31 disables the input and selection of the setting value for a function that cannot be performed by the multifunction peripheral 10.

Then, the controller 31 stores the received setting value in the setting value storage area 419 (Step S660).

The controller 31 determines whether the "start button" has been pressed by the user (Step S670). When it is determined that the "start button" has been pressed by the user, the controller 31 generates the setting information from various setting values stored in the setting value storage area 419 (Step S680b). Then, the controller 31 sends the generated setting information to the network service 50 together with the identification information of the multifunction peripheral 10 and ends the process (Step S690).

Figure 20:
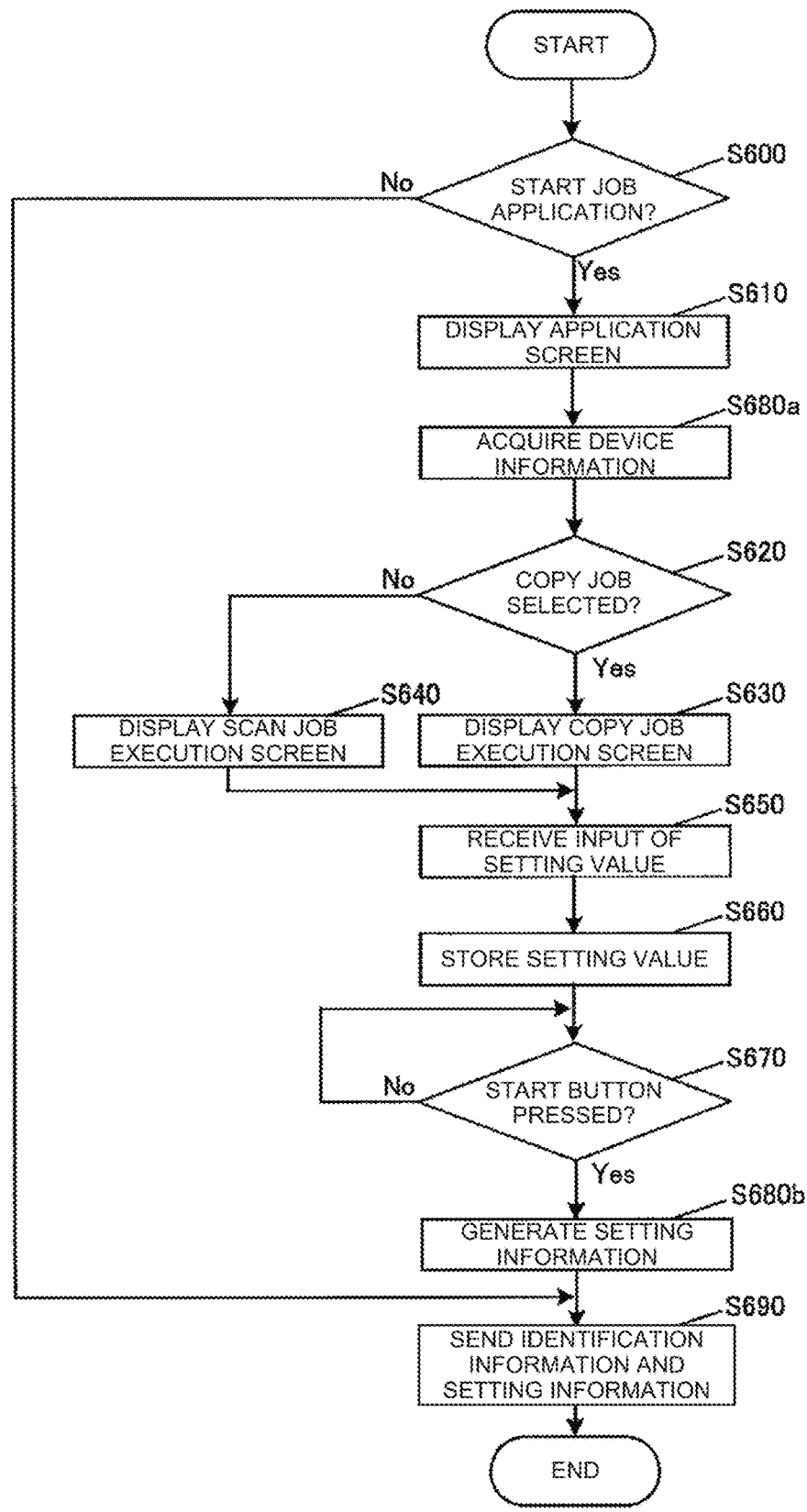
FIG. 20 is a flowchart illustrating a process of the terminal device according to a second embodiment.
Figure 21:
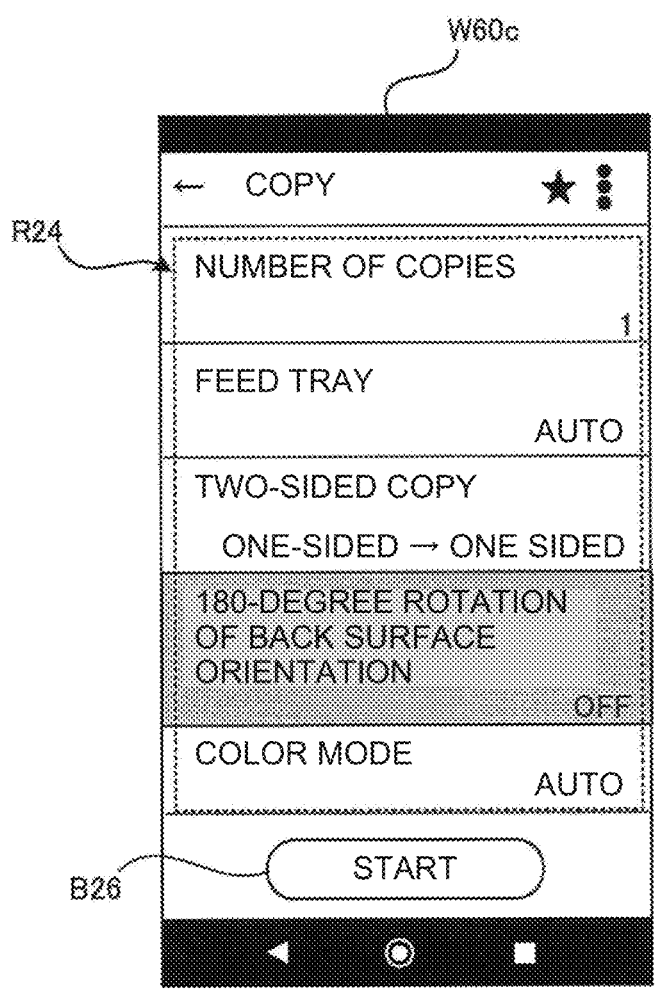
FIG. 21 is a diagram illustrating a configuration example of a copy job execution screen displayed by the terminal device according to the second embodiment.

FIG. 21 illustrates a configuration example of the copy job execution screen presented on the display 33 when the copy job is selected by the user. This operation example corresponds to Steps S620, S630, and S650 of FIG. 20. A copy job execution screen W60c includes the setting value setting area R24 and the start button B26.

The configurations and functions of the setting value setting area R24 and the start button B26 on the copy job execution screen W60c are the same as those in the copy job execution screen W60a illustrated in FIG. 17. However, on the copy job execution screen W60c according to the second embodiment, the setting value for the function that cannot be performed by the multifunction peripheral 10 (e.g., "180-degree rotation of the back surface orientation") is displayed in dark so as not to be input or selected based on the previously acquired device information.

As described above, according to the second embodiment, in addition to the effect of the first embodiment, the function inexecutable by the image processing device, which is to execute the job, is displayed so as not to be input or selected in advance, and therefore it is possible to eliminate the time and effort required to set the inexecutable setting value.

3 Third Embodiment

In the description according to the first embodiment and the second embodiment, the invention according to the present disclosure is applied to the multifunction peripheral. In the description according to a third embodiment, either the multifunction peripheral or the display device may be selected.

A functional configuration according to the third embodiment may be the same as that in the first embodiment or the second embodiment. Therefore, the same configuration as that in the first embodiment or the second embodiment is denoted by the same reference numeral, and the description thereof is omitted. The description of a common point in the processing flow is also omitted.

Figure 10:
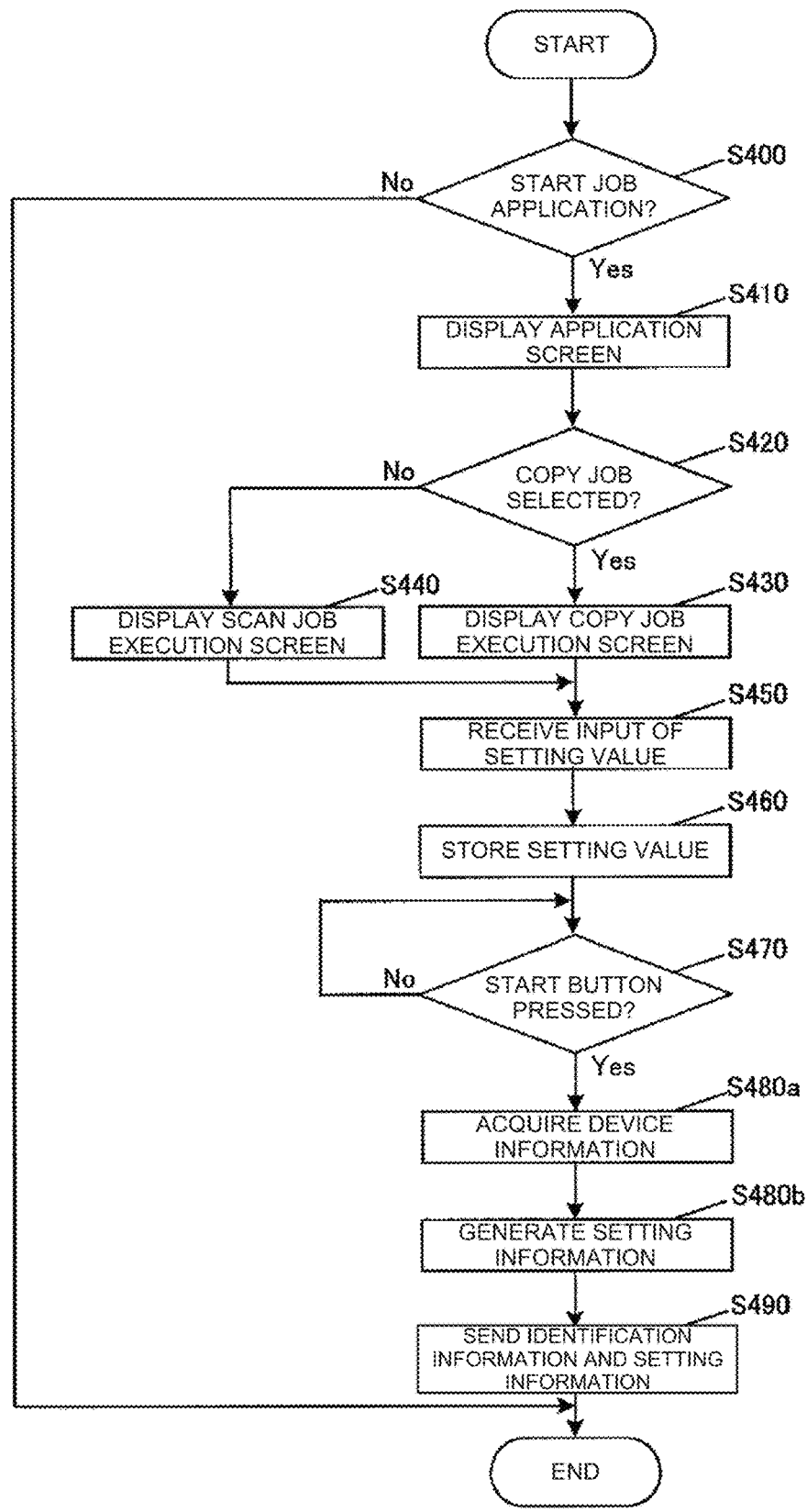
FIG. 10 is a flowchart illustrating a process of the terminal device according to the first embodiment.

The third embodiment is different from the first embodiment or the second embodiment in the configuration of the application screen presented on the display 33 at Step S410 of FIG. 10 or Step S610 of FIG. 20.

Figure 22:
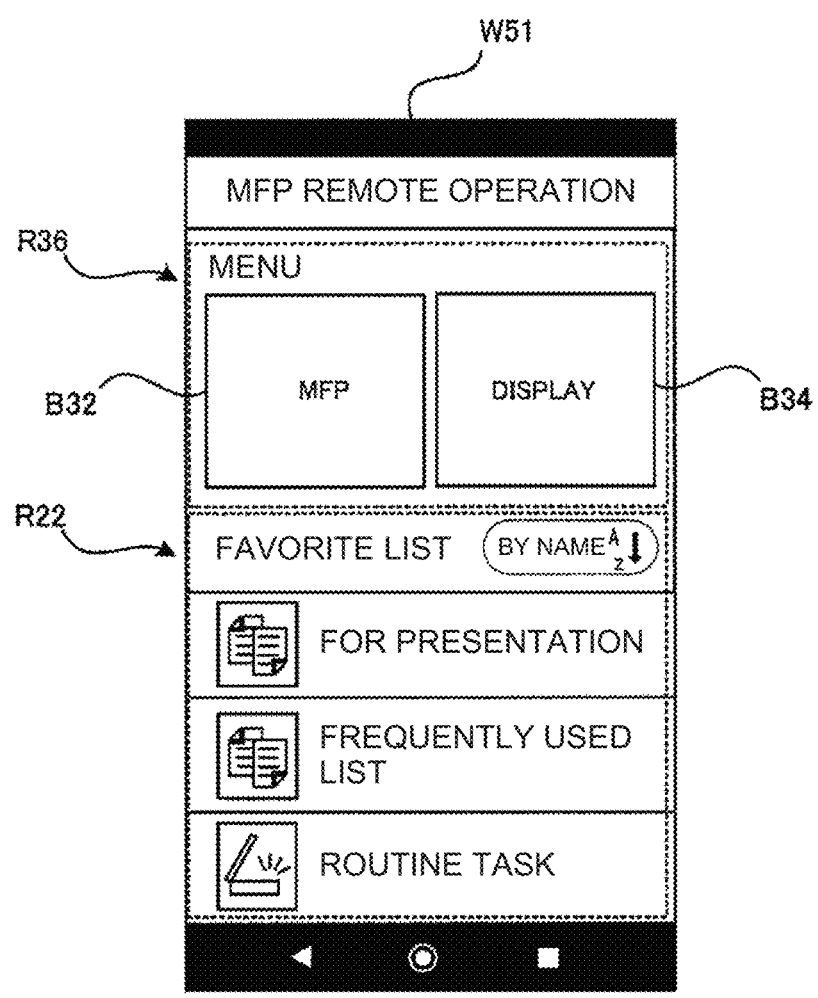
FIG. 22 is a diagram illustrating a configuration example of an application screen displayed by the terminal device according to a third embodiment.

FIG. 22 is a configuration example of an application screen presented on the display 33 by the controller 31 according to the third embodiment. An application screen W51 includes a menu display area R36 and a favorite list display area R22.

The menu display area R36 includes a multifunction peripheral selection button B32 and a display device selection button B34. The multifunction peripheral selection button B32 receives the selection of the multifunction peripheral by the user. When the pressing of the multifunction peripheral selection button B32 is received, the controller 31 determines that the multifunction peripheral has been selected by the user. When the pressing of the multifunction peripheral selection button B32 is received, the controller 31 displays the application screen W50 for the multifunction peripheral illustrated in FIG. 16 on the display 33.

Conversely, the display device selection button B34 receives the selection of the display device by the user. When the pressing of the display device selection button B34 is received, the controller 31 determines that the display device has been selected by the user. When the pressing of the display device selection button B34 is received, the controller 31 displays an application screen (not illustrated) for the display device on the display 33.

Figure 23:
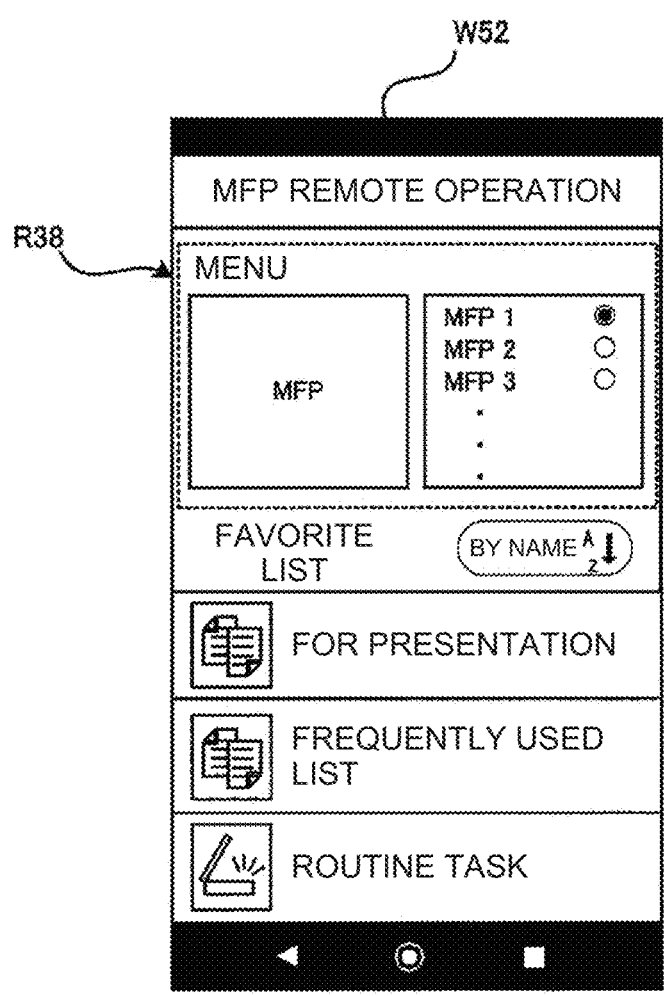
FIG. 23 is a diagram illustrating a configuration example of an application screen displayed by the terminal device according to the third embodiment.

When there is a plurality of multifunction peripherals or display devices selected via the application screen W51, a selection screen may be provided to further receive the selection of the output device desired by the user. FIG. 23 illustrates a configuration example of an application screen W52 including a menu display area R38 prompting the user to further select the multifunction peripheral when the user selects the multifunction peripheral as an output device on the application screen W51 and there is a plurality of multifunction peripherals (MFP1 to MFP3) that may execute the job.

The user may select the desired multifunction peripheral from a plurality of existing multifunction peripherals via the application screen W52.

As described above, according to the third embodiment, it is possible to select the display device other than the multifunction peripheral as another output device while the same effect as that in the first embodiment or the second embodiment may be obtained. Furthermore, even though a plurality of output devices (multifunction peripherals) is available, the user may easily select the output device that is to execute the job.

4 Fourth Embodiment

According to a fourth embodiment, the output of the job is controlled based on a user authentication result.

4.1 Functional Configuration

4.1.1 About Multifunction Peripheral 90

The functional configuration of the multifunction peripheral according to the fourth embodiment may be substantially the same as that of the multifunction peripheral 10 according to the first embodiment. Therefore, the same configuration as that of the multifunction peripheral 10 according to the first embodiment is denoted by the same reference numeral, the description is omitted, and the different parts are described.

Figure 24:
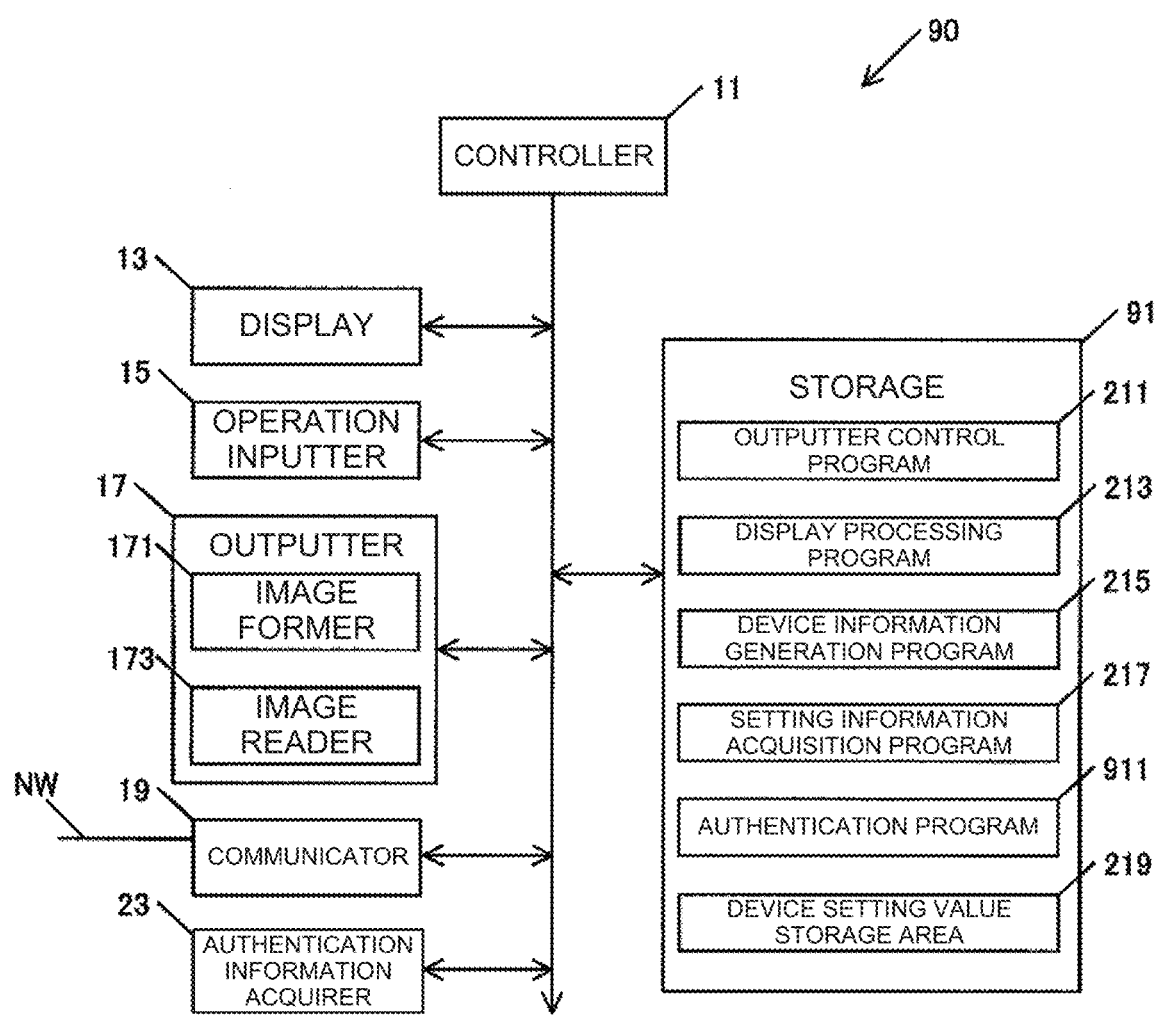
FIG. 24 is a diagram illustrating a functional configuration of the multifunction peripheral according to a fourth embodiment.

FIG. 24 is a diagram illustrating a functional configuration of a multifunction peripheral 90 according to the fourth embodiment. The multifunction peripheral 90 includes an authentication information acquirer 23 and a storage 91 instead of the storage 21 included in the multifunction peripheral 10.

The authentication information acquirer 23 acquires authentication information for user authentication. The authentication information acquirer 23 may be configured as a card reader that reads an ID (identity/identification) card, such as an IC (integrated circuit) card or a magnetic card, which has been distributed to the user. When the ID card is a contactless IC card, the card reader is a contactless IC card reader. The authentication information acquirer 23 reads the ID card to acquire the user authentication information (user identification information, connection ID, etc.) recorded on the ID card. The authentication information acquirer 23 is not limited to a card reader, and its configuration is not particularly limited as long as the authentication information acquirer 23 may perform communications via a short-range wireless communication protocol such as Wi-Fi (registered trademark), Bluetooth (registered trademark), infrared, Near Field Communication (NFC), or Radio Frequency Identification (RFID), and acquire the authentication information for user authentication. Furthermore, an imaging device such as a scanner device or a camera may be included to support biometric authentication such as fingerprint authentication and face authentication.

According to the fourth embodiment, the storage 91 stores the outputter control program 211, the display processing program 213, the device information generation program 215, the setting information acquisition program 217, and an authentication program 911 and ensures the device setting value storage area 219.

The authentication program 911 is a program read by the controller 11 to authenticate the user who logs into the multifunction peripheral 90. After reading the authentication program 911, when the authentication function is on, the controller 11 performs user authentication based on the authentication information received via the authentication information acquirer 23 and the login screen described below. The user authentication may be performed by biometric authentication, etc., in addition to property authentication via the authentication information acquirer 23 and knowledge authentication such as the combination of the login user name and the login password.

As the functional configurations of the terminal device 30 and the network service 50 may be substantially the same as those in the first embodiment, the description here is omitted.

4.2 Process Flow

As the overall process according to the fourth embodiment, the process regarding the terminal device 30, and the process regarding the network service 50 may be substantially the same as those in the first embodiment, the description here is omitted.

4.2.1 About Process of Multifunction Peripheral 90

Figure 25:
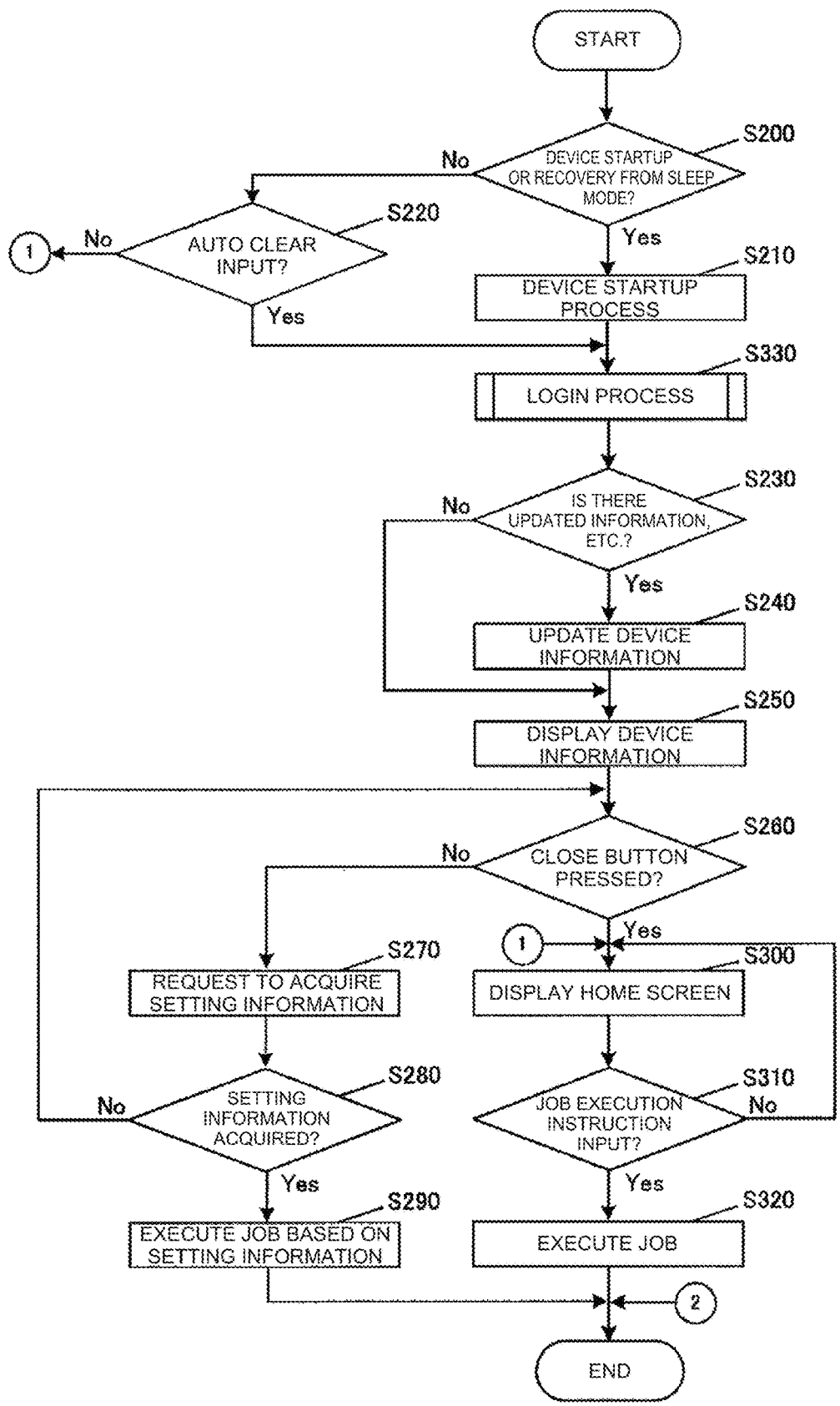
FIG. 25 is a flowchart illustrating a process of the multifunction peripheral according to the fourth embodiment.

The process of the multifunction peripheral 90 will be described using the flowchart in FIG. 25. The process that may be the same as the process described in the flowchart of FIG. 9 according to the first embodiment is denoted by the same step number and its description is omitted. The process described in FIG. 25 is different from the process described in FIG. 9 in that a login (user authentication) process is performed after the device startup process at Step S210 and the process returns to Step S260 when no setting information is obtained at Step S280. This is described below.

At Step S210, after the device startup process ends, the controller 11 reads the authentication program 911 to perform the login process (authentication process) (Step S330). After the login process ends, the controller 11 proceeds to the process at Step S230. The login process will be described in FIG. 26.

When no setting information is acquired from the network service 50 at Step S280, the controller 11 returns to the process at Step S260. Then, the controller 11 executes the process at Step S260 and subsequent steps.

Next, the login process (authentication process) for Step S330 in FIG. 25 will be described. Here, a description is given using FIGS. 26 to 28 in accordance with the mode that may be made when the authentication result indicates unauthenticated.

4.2.2 About Mode to Repeat Authentication Process when Authentication Result Indicates Unauthenticated The mode to repeat the authentication process when the authentication result indicates unauthenticated will be described using the flowchart in FIG. 26.

When the login process is started, the controller 11 determines whether the authentication mode is enabled (ON) or disabled (OFF) (Step S3310). In this case, the controller 11 refers to the setting value for enabling/disabling the authentication mode, which have been previously set via for example the system settings to determine whether the authentication mode is enabled or disabled.

When it is determined that the authentication mode is enabled, the controller 11 starts a preparation to receive the authentication information (Step S3310; Yes→Step S3320). In this case, the controller 11 initializes the authentication information acquirer 23 and displays the login screen described below on the display 13 to thus stand by for the input of the authentication information by the user.

Conversely, when it is determined that the authentication mode is disabled, the controller 11 ends the login process (Step S3310; No). At the end of the login process, the controller 11 may display a message indicating that the process has ended on the display 13 as the authentication mode is disabled.

When the preparation has been made for the input of the authentication information, the controller 11 determines whether the authentication information has been input by the user (Step S3320→Step S3330).

When it is determined that the authentication information has been input via the authentication information acquirer 23 or the login screen, the controller 11 receives the input authentication information (Step S3330; Yes→Step S3340). Conversely, when it is determined that the authentication information has not been input, the controller 11 waits until the authentication information is input (Step S3330; No).

When the input authentication information is received, the controller 11 performs the authentication process for the received authentication information (Step S3340→Step S3350). For example, when the authentication process is performed based on the authentication information input via the login screen, the controller 11 previously stores the login user name and the login password in association with each other. Then, user authentication may be performed by checking the login user name and the login password as the authentication information input via the login screen.

When it is determined that the authentication is successful, the controller 11 ends the login process (Step S3350; Yes). Then, the controller 11 proceeds to the process at Step S230 in FIG. 25.

Conversely, when it is determined that the authentication has failed, the controller 11 returns to the process at Step S3330 and repeatedly receives the input of the authentication information until the authentication succeeds (Step S3350; No→Step S3330).

4.2.3 About Mode to End Process Using Multifunction Peripheral 90 when Number of Times Improper Authentication Information has been Input is Equal to or More than Limit The mode to end the process using the multifunction peripheral 90 and limit the output of the job when the number of times the improper authentication information has been input is equal to or more than the limit will be described using the flowchart in FIG. 27. The process described in FIG. 27 is a process obtained by adding the process to determine whether the number of times the authentication information has been input is equal to or more than the limit between the process at Step S3330 and the process at Step S3340 described in FIG. 26.

Figure 26:
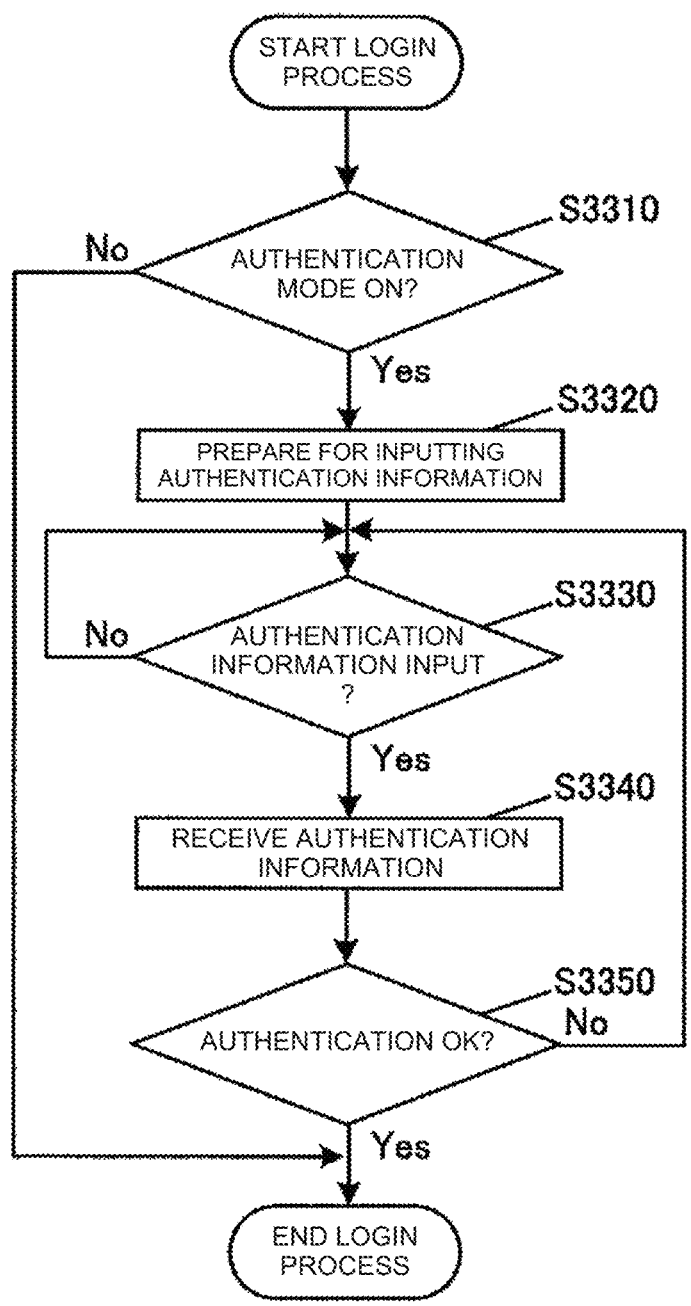
FIG. 26 is a flowchart illustrating a process of the multifunction peripheral according to the fourth embodiment.
Figure 27:
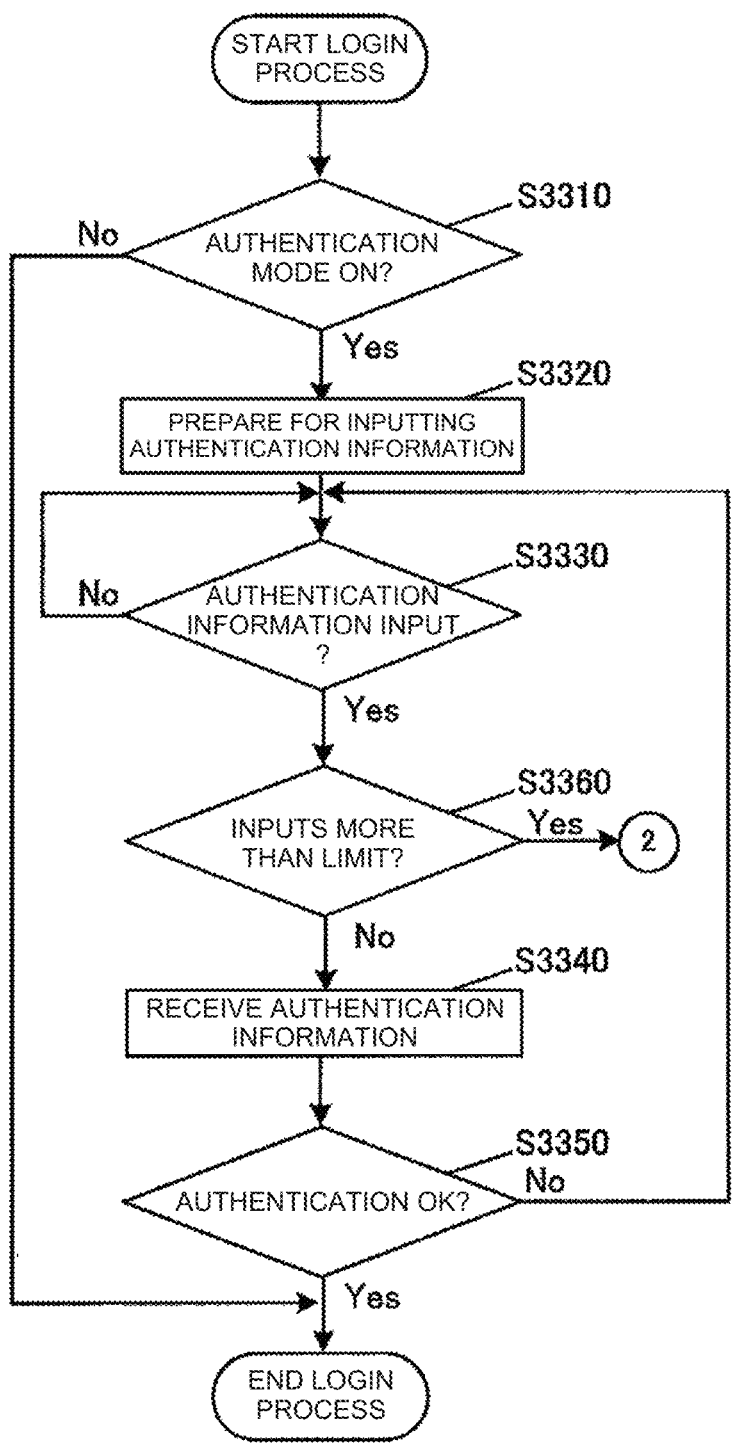
FIG. 27 is a flowchart illustrating a process of the multifunction peripheral according to the fourth embodiment.

In the same manner as in the mode described in FIG. 26, when it is determined that the authentication has failed, the controller 11 returns to the process at Step S3330 and determines whether the authentication information has been input by the user (Step S3350; No→Step S3330).

When it is determined that the authentication information has been input, the controller 11 determines whether the number of times the authentication information has been input is equal to or more than a predetermined limit (Step S3330; Yes→Step S3360).

When it is determined that the number of times the authentication information has been input is equal to or more than the predetermined limit, the controller 11 ends the process by the multifunction peripheral 90 (Step S3360; Yes→"end").

When it is determined that the number of times the authentication information has been input is less than the predetermined limit, the controller 11 receives the input authentication information (Step S3360; No→Step S3340).

When the input authentication information is received, the controller 11 performs the authentication process for the received authentication information (Step S3340→Step S3350).

When it is determined that the authentication is successful, the controller 11 ends the login process (Step S3350; Yes). Then, the controller 11 proceeds to the process at Step S230 in FIG. 25.

Conversely, when it is determined that the authentication has failed, the controller 11 returns to the process at Step S3330 (Step S3350; No→Step S3330).

Figure 28:
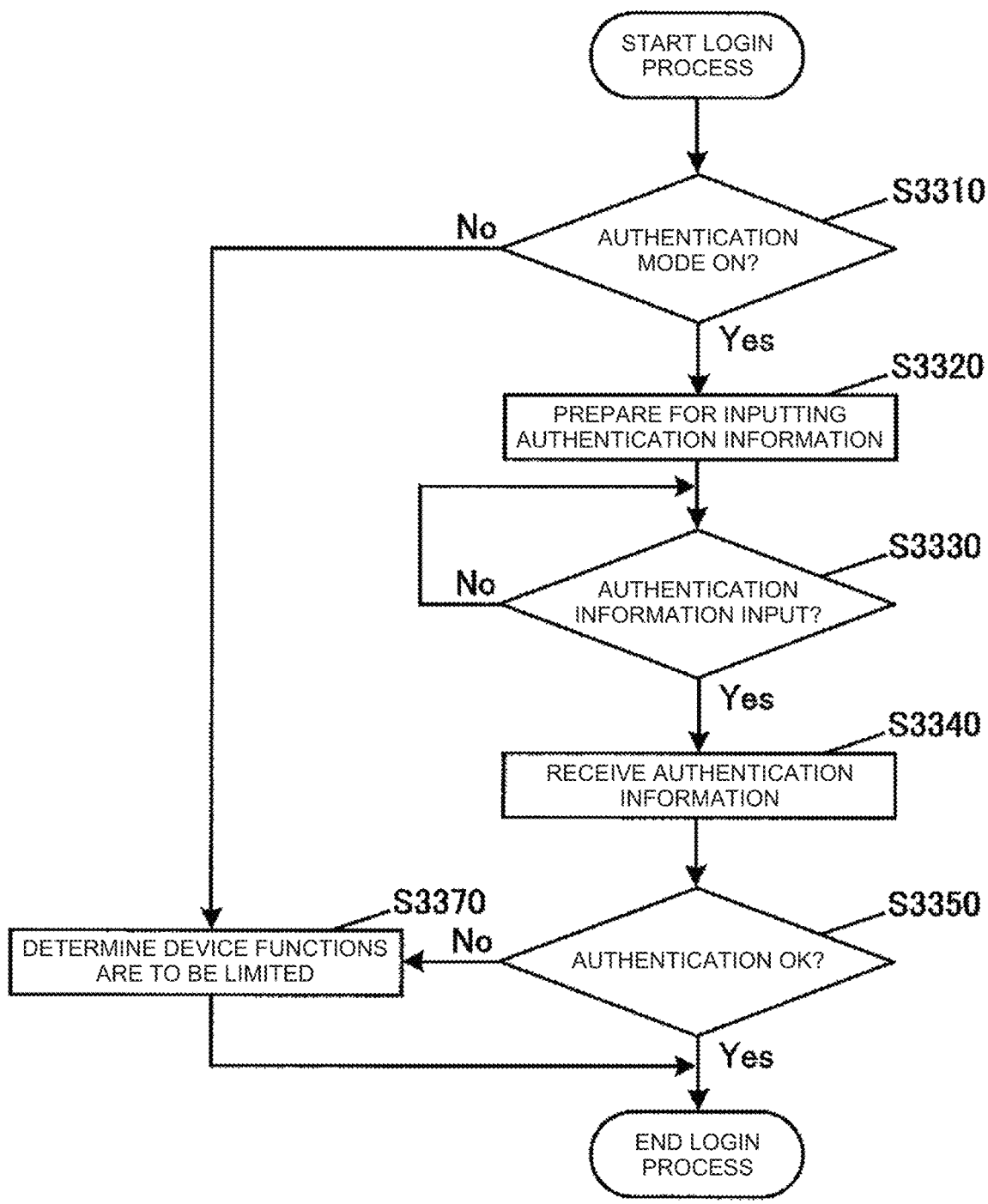
FIG. 28 is a flowchart illustrating a process of the multifunction peripheral according to the fourth embodiment.

4.2.4 About Mode to Limit Device Function of Multifunction Peripheral 90 when Authentication Result Indicates Unauthenticated The mode to limit the device function of the multifunction peripheral 90 when the authentication result indicates unauthenticated will be described using the flowchart in FIG. 28. The process described in FIG. 28 is obtained by adding the process to determine that the device function of the multifunction peripheral 90 is to be limited when the controller 11 determines that the authentication has failed during the authentication process at Step S3350 described in FIG. 26.

Here, device function limitation refers to limiting the function that is supposed to be executable by the multifunction peripheral 90, such as job execution for a specific type of job, e.g., copy, scan, fax, and e-mail, reference to history information, and change in the operation mode, to limit the device function executable by the user who is determined to be unauthenticated. For example, the job execution itself of a specific type of job, such as fax and e-mail, may be limited as the target for device function limitation, or some functions included in the job may be designated as the target of function limitation. When it is determined that the device function is to be limited, the controller 11 limits the target device function.

At Step S3350, when it is determined that the authentication has failed, the controller 11 determines that the device function is to be limited and ends the process (Step S3350; No→Step 3370). Also, when it is determined that the authentication mode is disabled at Step S3310, the controller 11 determines that the device function is to be limited and ends the process (Step S3310; No→Step 3370). When limiting the device function, the controller 11 may display, on the display 13, a message indicating that the device function is limited as the authentication mode is disabled or the authentication has failed.

The login processes described in [4.2.2], [4.2.3], and [4.2.4] above may be performed independently or in combination. For example, during the login process described in [4.2.4], it is possible to have a configuration such that it is determined that the device function is to be limited when the number of times the authentication information has been input is equal to or more than the predetermined limit. It is also possible to select whether to end the process by the multifunction peripheral 90 or to determine that the device function is to be limited when the number of times the authentication information has been input is equal to or more than the predetermined limit.

4.3 Operation Example

Figure 29:
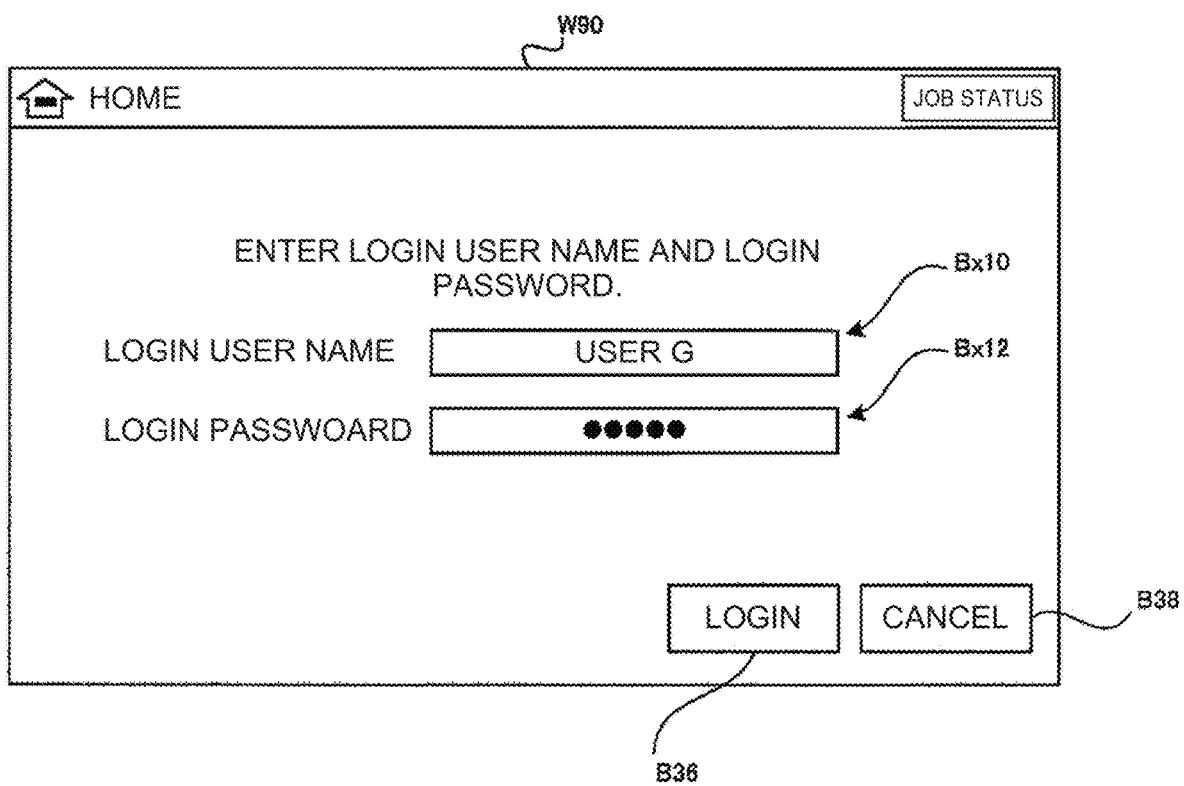
FIG. 29 is a diagram illustrating a configuration example of a login screen displayed by the multifunction peripheral.

Next, an operation example according to the fourth embodiment will be described. FIG. 29 is a diagram illustrating a configuration example of a login screen W90 presented on the display 13 when the controller 11 reads the authentication program 911.

The login screen W90 includes a login user name input box Bx10, a login password input box Bx12, a login button B36, and a cancel button B38.

The login user name input box Bx10 is a box that receives the input of the login user name of the user who attempts to log into the multifunction peripheral 90.

The login password input box Bx12 is a box that receives the input of the login password associated with the login user name of the user who attempts to log into the multifunction peripheral 90.

The login button B36 is a button that receives the instruction for confirming the content input to the login user name input box Bx10 and the login password input box Bx12 by the user. The cancel button B38 is a button that receives the input of the instruction for cancelling the login process. The user inputs the login user name in the login user name input box Bx10 and the login password in the login password input box Bx12 and then selects the login button B36 so as to input the instruction for executing the login process.

Figure 30:
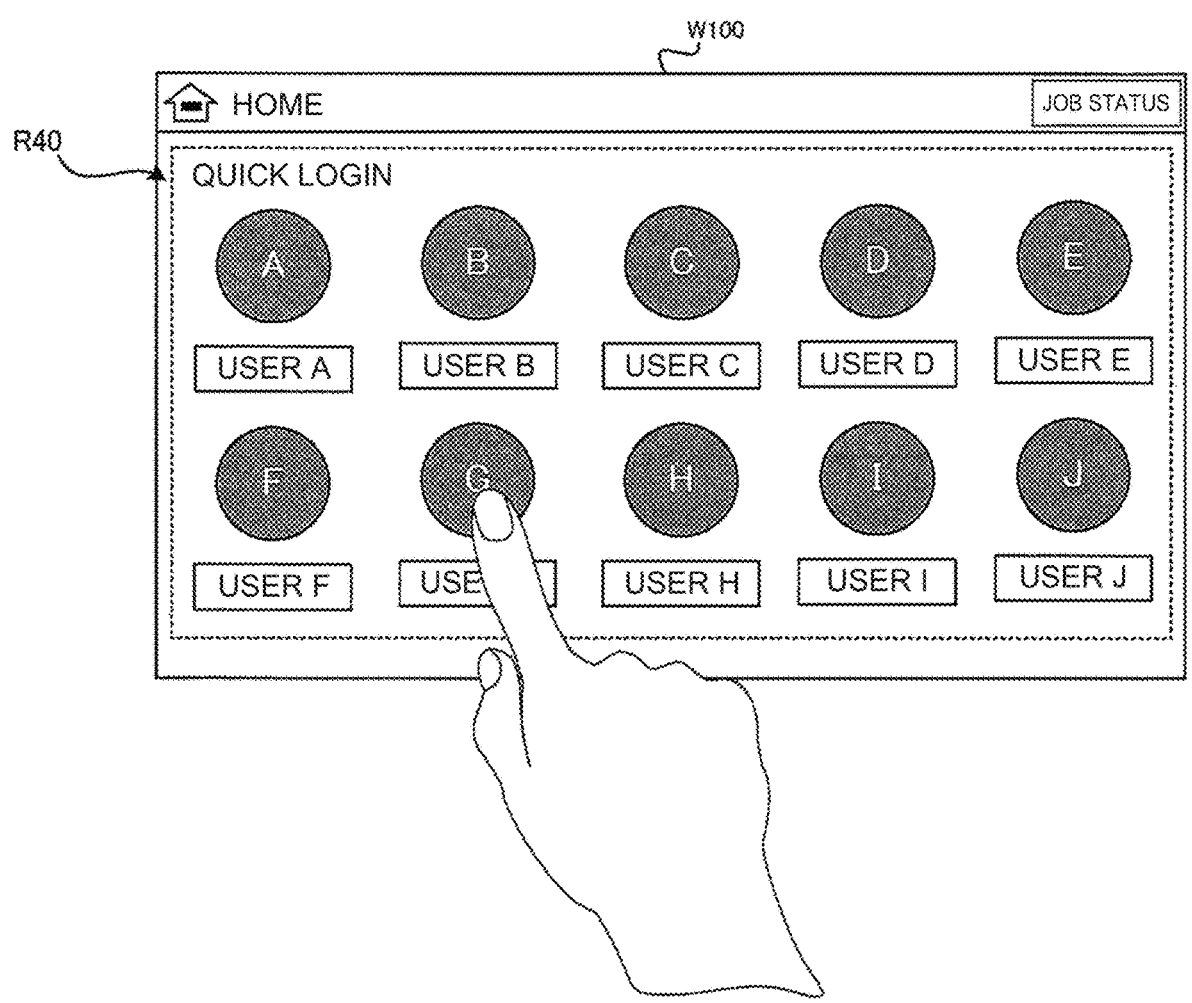
FIG. 30 is a diagram illustrating a configuration example of another login screen displayed by the multifunction peripheral.

FIG. 30 is a diagram illustrating another mode of the login screen. A login screen W100 includes a selection button display area R40 that displays selection buttons assigned to the respective users who attempt to log into the multifunction peripheral 90.

The selection buttons illustrated in the selection button display area R40 are created as icons for the respective users based on the user's authentication information (e.g., the login user name, the e-mail address, and the login password) registered via a user addition/editing screen (not illustrated).

A user who attempts to log into the multifunction peripheral 90 selects the icon (selection button) representing him or her. The login authentication may then be performed by inputting the login password via the login password input screen (not illustrated) that is displayed by selecting the icon. By selecting the icon representing the user, the login screen W100 may eliminate the need to input the login user name and perform the login process easily and quickly.

Figure 31:
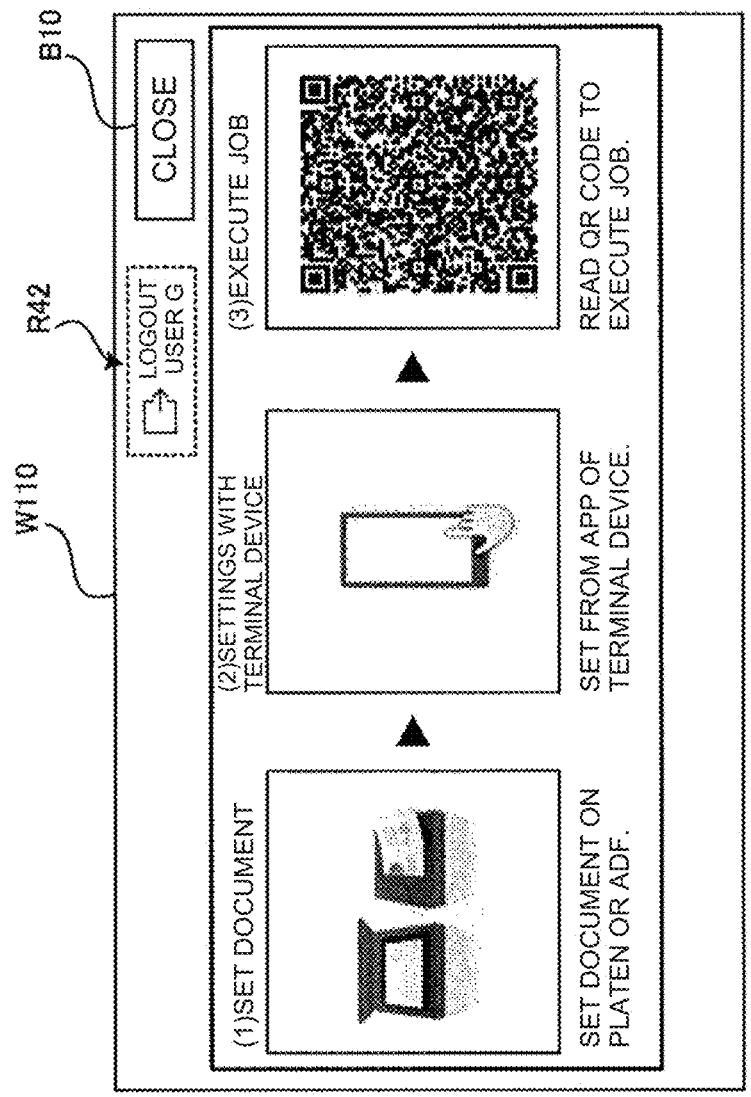
FIG. 31 is a diagram illustrating a configuration example of a display screen displayed by the multifunction peripheral.

FIG. 31 illustrates a configuration example of a display screen W110 that is presented on the display 13 by the multifunction peripheral 90. This operation example corresponds to Step S250 in FIG. 25. The display screen W110 may have the same configuration as that of the display screen W10 according to the first embodiment, but is different from the display screen W10 in that a login user name display area R42 is included. FIG. 31 illustrates an example in which a user having the login user name "user G" has successfully logged into the multifunction peripheral 90. The login user name display area R42 is configured as a selection button to enable logout from the multifunction peripheral 90.

Figure 32:
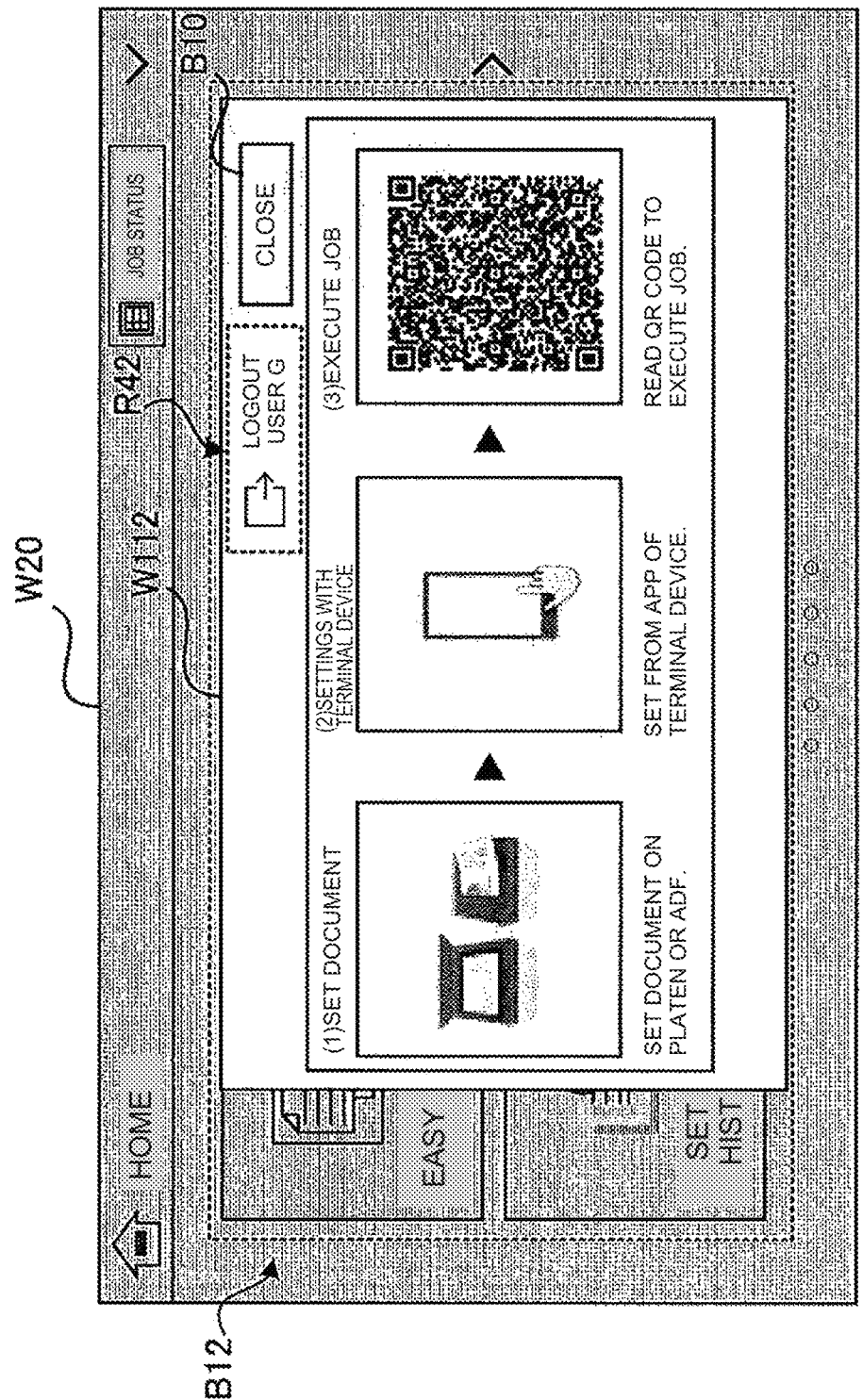
FIG. 32 is a diagram illustrating a configuration example of another display screen displayed by the multifunction peripheral.

FIG. 32 is a diagram illustrating another mode of the display screen that is presented on the display 13 by the multifunction peripheral 90. FIG. 32 illustrates an example in which a display screen W112 is displayed on the home screen W20 in a superimposed manner, unlike the example in FIG. 31. In this case, the controller 11 grays out the entire home screen W20 to prevent the user from accidentally selecting the job/function selection button B12 on the home screen W20.

As illustrated in FIGS. 31 and 32, the login user name of the user who has logged into the multifunction peripheral 90 may be displayed on the screen such as the display screen W110 or the display screen W112, and therefore the user who reads the device information may recognize the login user who has logged into the multifunction peripheral 90.

Figure 33:
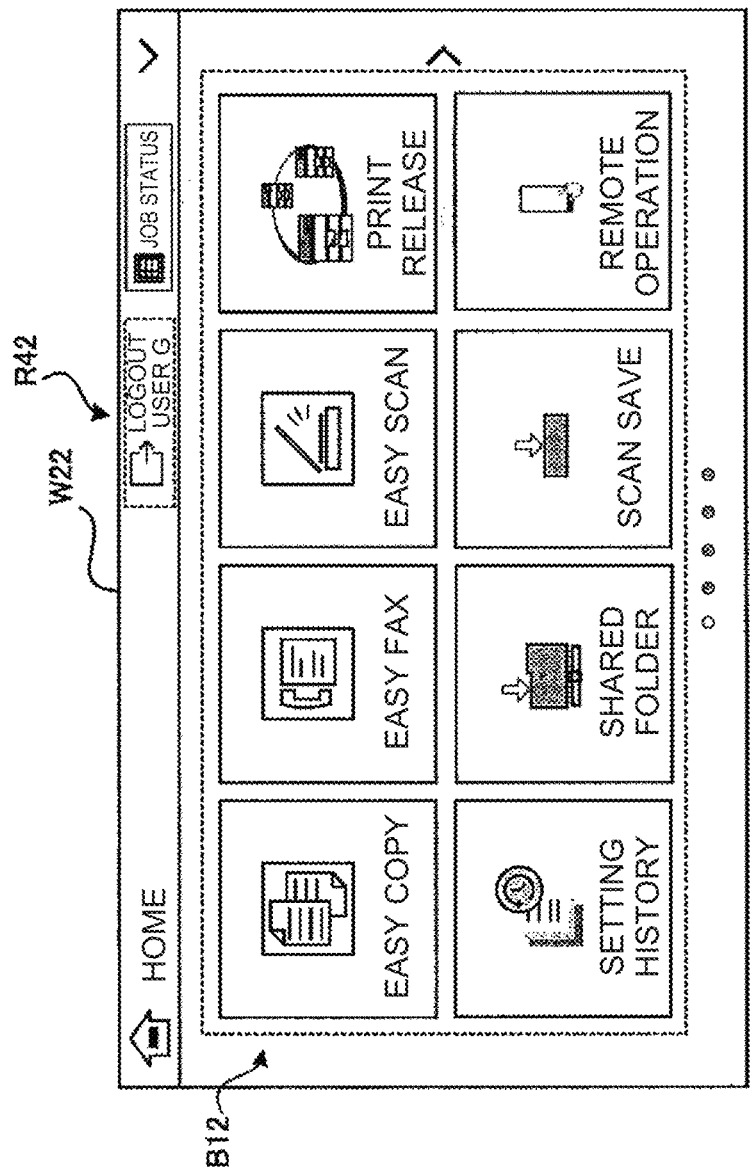
FIG. 33 is a diagram illustrating a configuration example of a home screen displayed by the multifunction peripheral.

FIG. 33 is a diagram illustrating a configuration example of a home screen W22 presented on the display 13 by the controller 11 due to the selection of the close button B10 on the display screen W110 illustrated in FIG. 31 or the display screen W112 illustrated in FIG. 32. The home screen W22 may have the same configuration as that of the home screen W20 illustrated in FIG. 13, but is different from the home screen W20 in that the login user name display area R42 is included. When the close button B10 of the display screen W112 illustrated in FIG. 32 is selected, the login user name display area R42 displayed on the display screen W112 is continuously displayed on the home screen W22. Thus, with the configuration in which the login user name display area R42 is continuously displayed in response to the screen transition from the display screen to the home screen, the user may properly recognize the login user name of the user who has logged into the multifunction peripheral 90 even when the user desires to execute the job via the normal home screen without using the output method according to the present disclosure.

Figure 34:
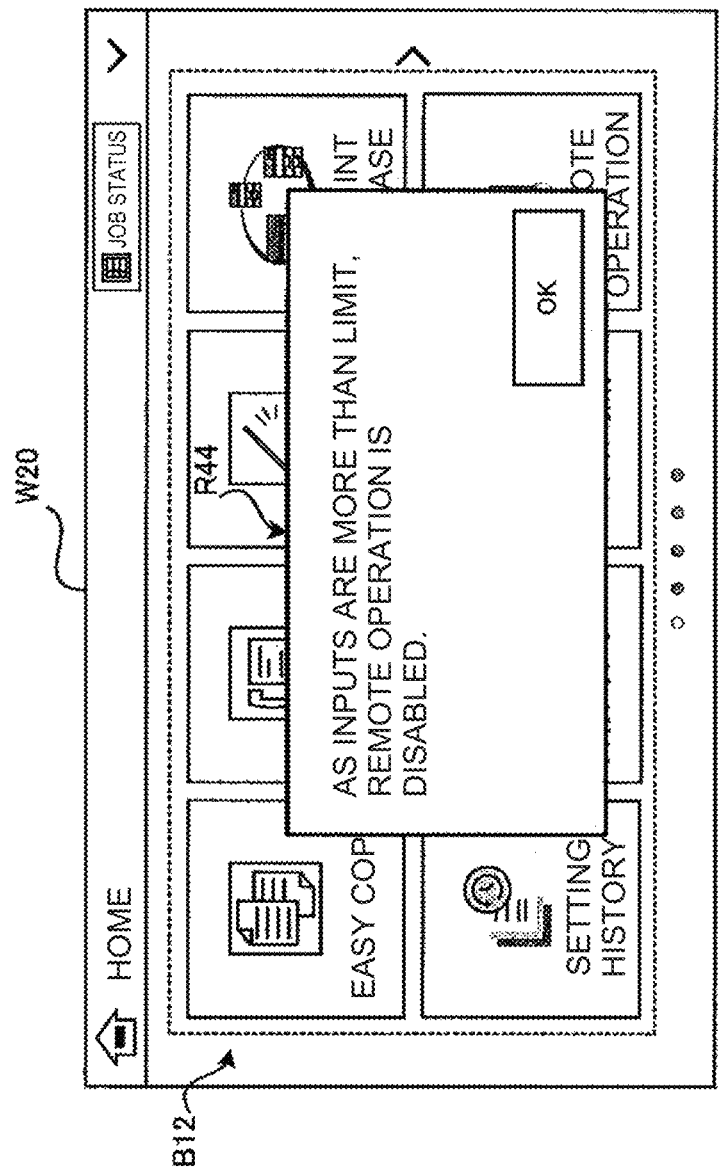
FIG. 34 is a diagram illustrating a configuration example of a message display area displayed by the multifunction peripheral.

FIG. 34 is a diagram illustrating a configuration example of a message display area R44 in which the controller 11 makes a notification when the number of times the improper authentication information has been input is equal to or more than the limit.

The controller 11 may end the process by the multifunction peripheral 90 and limit the output of the job when the number of times the improper authentication information has been input is equal to or more than the limit. Here, the controller 11 displays, on the home screen W20, a message such as "as inputs are more than the limit, remote operation is disabled." so as to notify the user that the process by the multifunction peripheral 90 has ended. Here, in order to emphasize the fact that the job/function selection button B12 is not selectable, the button may be grayed out.

Figure 35:
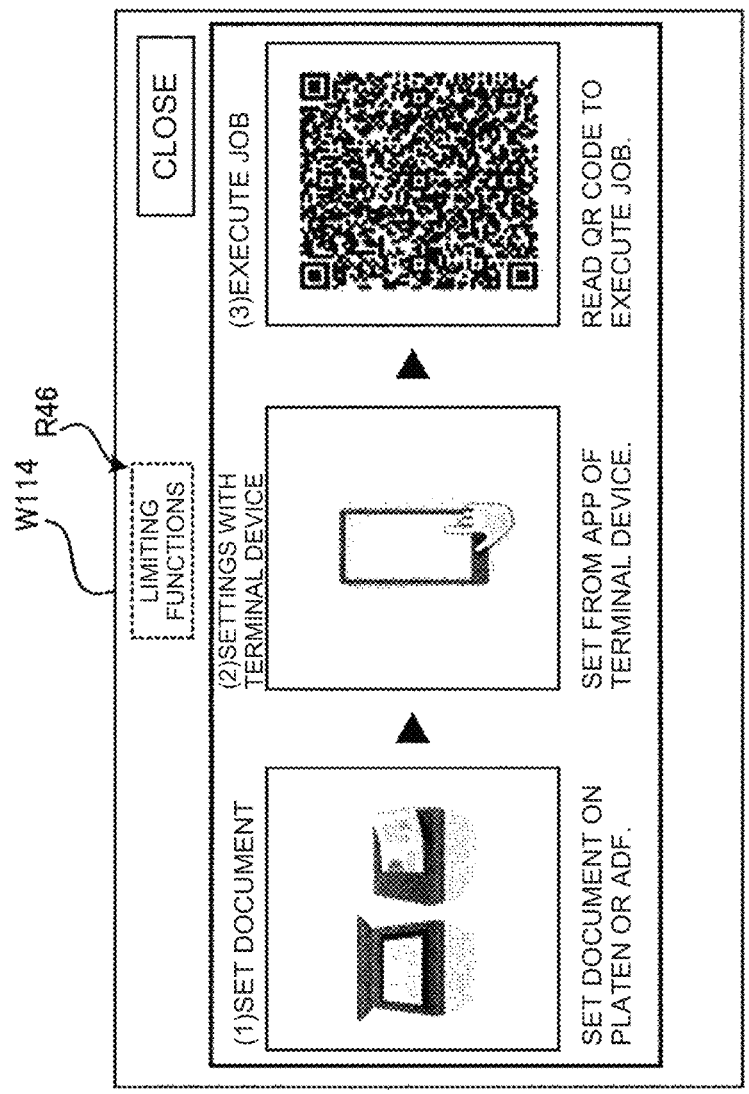
FIG. 35 is a diagram illustrating a configuration example of a display screen displayed by the multifunction peripheral.

FIG. 35 illustrates a configuration example of a display screen W114 displayed by the controller 11 when the authentication result indicates unauthenticated and the device function of the multifunction peripheral 90 is limited. This operation example corresponds to Step S3370 in FIG. 28. The display screen W114 may have the same configuration as that of the display screen W10 according to the first embodiment, but is different from the display screen W10 in that a function limit display area R46 is included to indicate that the device function is being limited.

Figure 36:
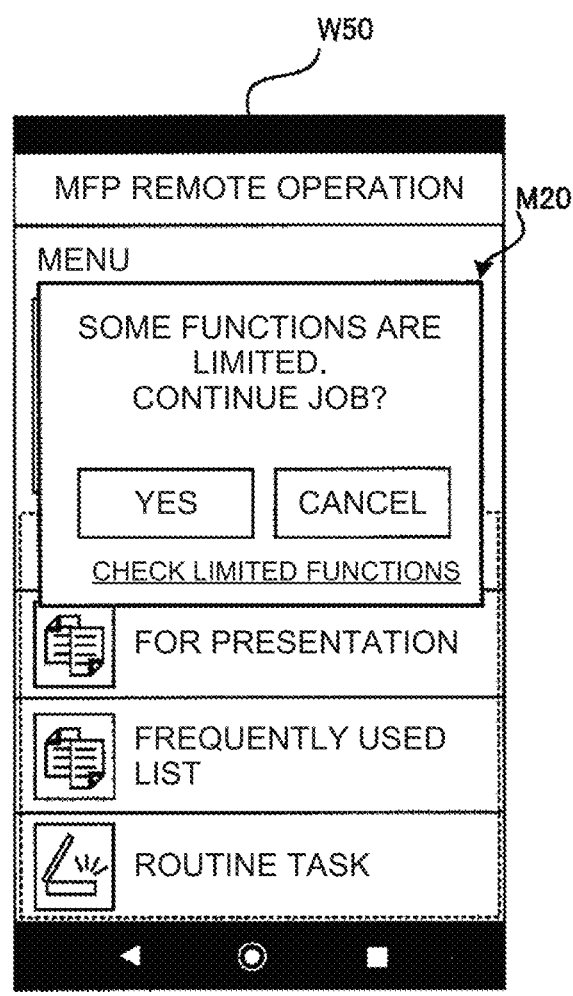
FIG. 36 is a diagram illustrating a configuration example of an application screen displayed by the terminal device.

Here, the controller 31 of the terminal device 30 may display, on the display 33, a modal M20 indicating a message that the device function of the multifunction peripheral 90 is being limited, as illustrated in FIG. 36. In this case, the multifunction peripheral 90 generates the device information including the message that the device function is being limited. The controller 31 of the terminal device 30 may read the device information to determine that the device function of the multifunction peripheral 90 is being limited.

The modal M20 displays, for the user, a message such as "some functions are limited. Execute a job?" indicating that some (or all) functions of the multifunction peripheral 90 are being limited. The user selects a Yes button when there is no problem in executing the job even though some functions are being limited. On the other hand, to cancel the continuation of the job, the user selects the cancel button. Here, as illustrated in the example of FIG. 36, the modal M20 may include a receiver that receives the instruction for referring to the limited functions (e.g., a "check limited functions" button).

As described above, according to the fourth embodiment, in addition to the effect of the first embodiment, the output of the job may be controlled based on the user authentication result.

5 Another Mode

In the configuration described according to the first embodiment, either the copy job or the scan job is selectable via the application screen of the terminal device 30. Here, a description is given of another mode when jobs other than a copy job and a scan job are selected. Here, other jobs are for example jobs other than a copy job and a scan job, are not particularly limited as long as the jobs may be set via the application screen, and examples thereof include a scan save job and a fax job.

Figure 37:
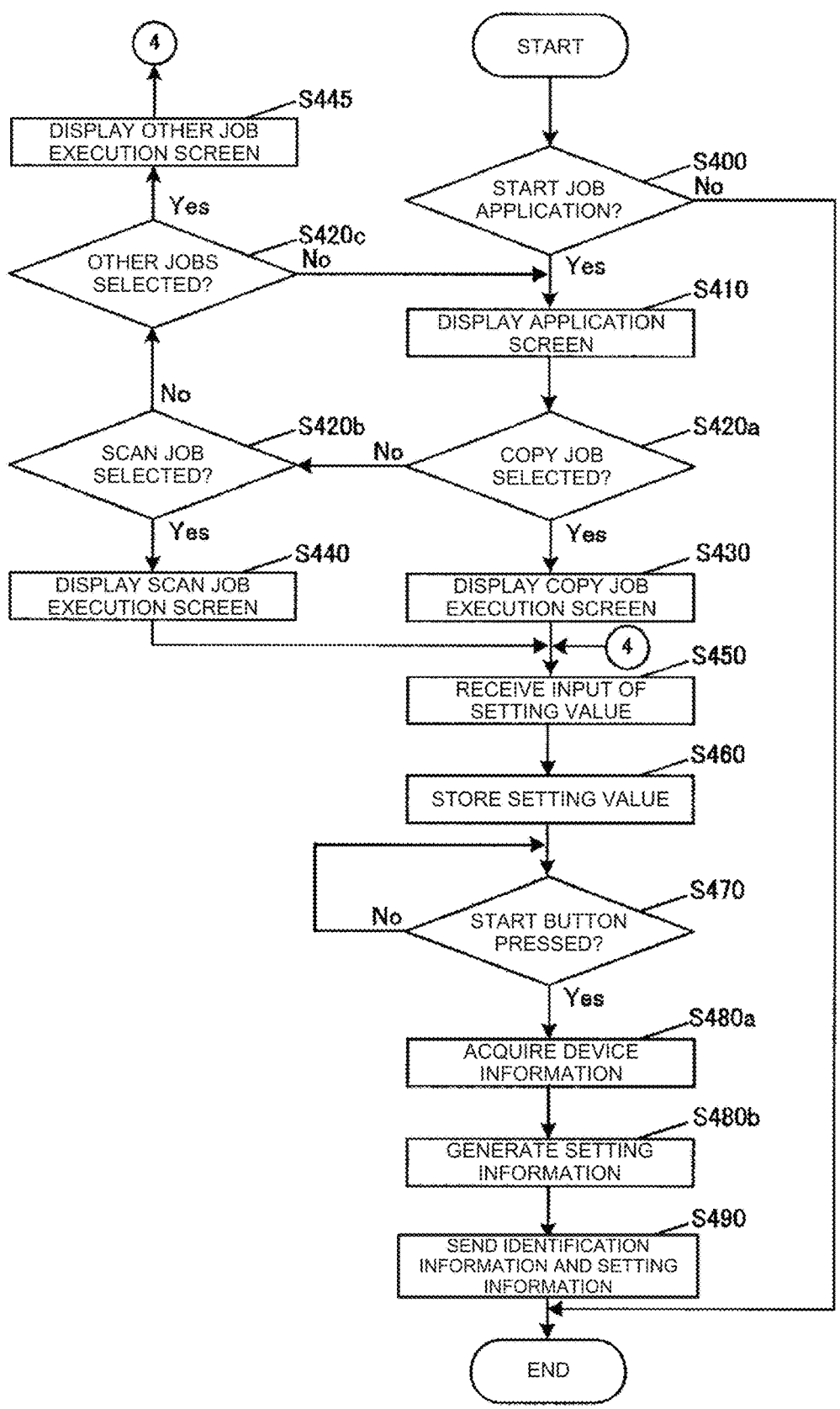
FIG. 37 is a flowchart illustrating a process of the terminal device according to another mode.

The process of the terminal device 30 according to another mode will be described using FIG. 37. The process of the terminal device 30 according to another mode is obtained by replacing the process from Steps S420 to S440 described in the flowchart of FIG. 10 with Steps S420a to S445. The process that may be the same as that in FIG. 10 is denoted by the same step number and the description thereof is omitted.

The controller 31 determines whether a copy job has been selected by the user via the application screen (Step S420a). When it is determined that a copy job has been selected by the user, the controller 31 displays the copy job execution screen on the display 33 (Step S420a; Yes→Step S430). Conversely, when it is determined that a copy job has not been selected by the user, the controller 31 determines whether a scan job has been selected (Step S420a; No→Step S420b).

When it is determined that a scan job has been selected by the user, the controller 31 displays the scan job execution screen on the display 33 (Step S420b; Yes→Step S440). Conversely, when it is determined that a scan job has not been selected by the user, the controller 31 determines whether other jobs have been selected (Step S420b; No→Step S420c)

When it is determined that other jobs have been selected by the user, the controller 31 displays the other job execution screen on the display 33 (Step S420c; Yes→Step S445). Conversely, when it is determined that other jobs have not been selected by the user, the controller 31 returns to the process at Step S410 and display the application screen (Step S420c; No→Step S410).

The controller 31 receives the input of the setting value via any of the copy job execution screen displayed at Step S430, the scan job execution screen displayed at Step S440, and the other job execution screen displayed at Step S445 (Step S450). Then, the controller 31 stores the received setting value in the setting value storage area 419 (Step S460). The process after Step S470 may be performed in the same manner as in FIG. 10.

Figure 38:
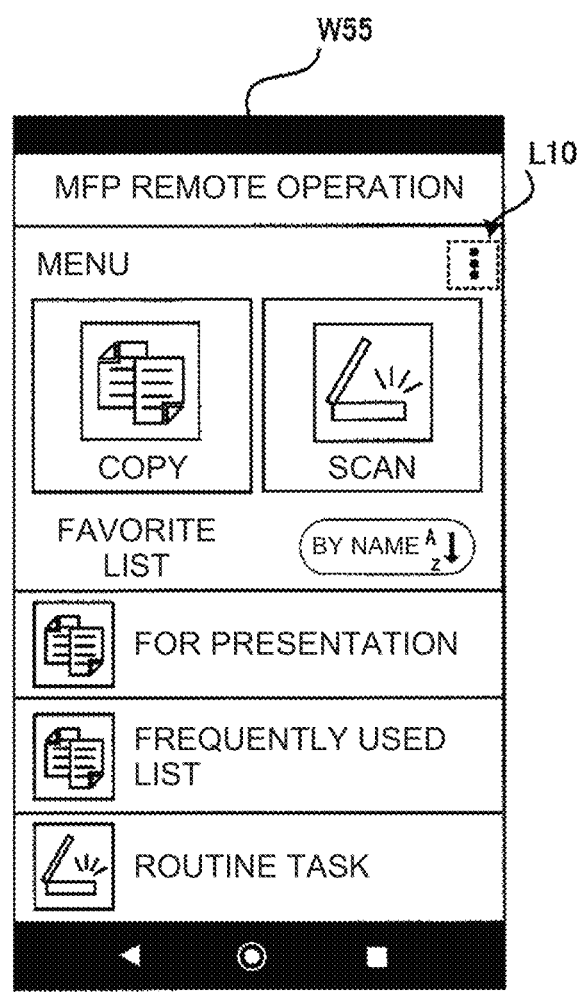
FIG. 38 is a diagram illustrating a configuration example of an application screen displayed by the terminal device.

FIG. 38 illustrates a configuration example of an application screen W55 that is presented on the display 33 after receiving the instruction for starting the job application from the user. The application screen W55 may have the same configuration as that of the application screen W50 (for example, FIG. 16) according to the first embodiment, but is different from the application screen W50 in that a selector (a three-point reader L10) is included to receive the selection of other jobs. Although the three-point reader L10 is illustrated in FIG. 38 as the selector that receives the selection of other jobs, the selector is not limited to the three-point reader L10 as long as it is configured to allow the selection of executable jobs via the application screen W50.

Figure 39:
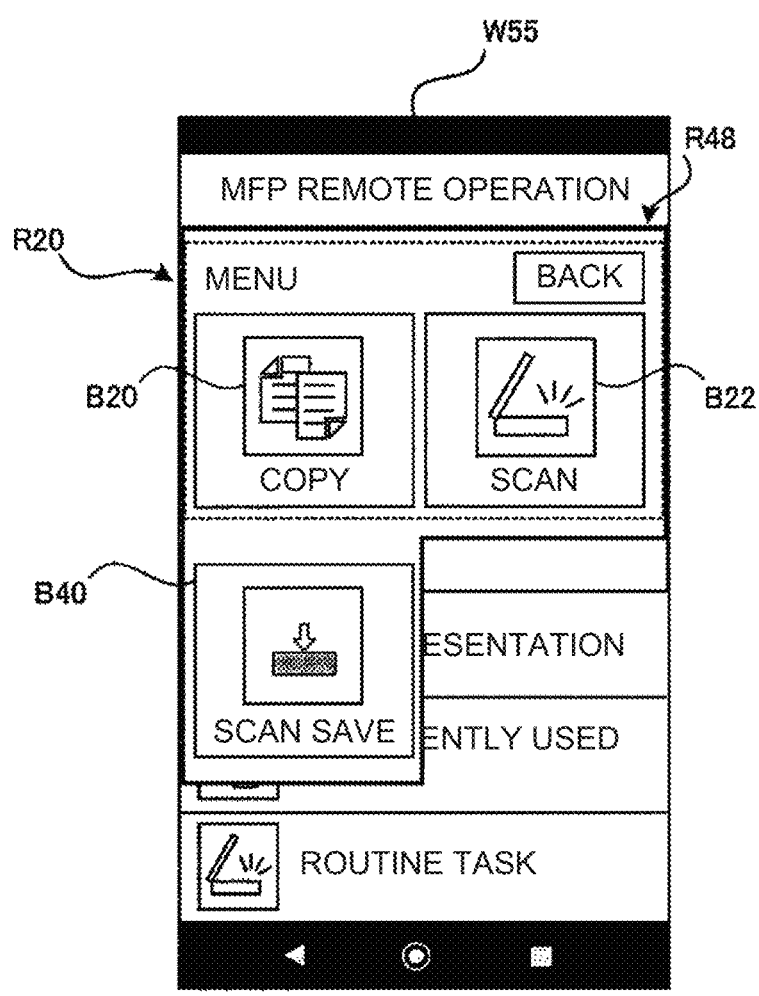
FIG. 39 is a diagram illustrating a configuration example of an application screen displayed by the terminal device.

FIG. 39 is a diagram illustrating a configuration of a menu display area R48 displayed by the controller 31 in response to the selection of the three-point reader L10 on the application screen W55 in FIG. 38.

In response to the instruction for selecting the three-point reader L10, the controller 31 displays a job selection button B40 (a scan save job selection button in the example of FIG. 39) for the job that is executable via the application screen W55. In this case, the controller 31 expands the display area of the menu display area R20, in which the copy job selection button B20 and the scan job selection button B22 may be displayed, to a menu display area R48 illustrated in FIG. 39 and then displays the job selection button B40.

As described above, according to another mode, jobs other than a copy job and a scan job may be selected via the application screen, and therefore the types of executable jobs may be expanded.

The present invention is not limited to the above-described embodiments, and various modifications may be made. That is, the technical scope of the present invention also includes embodiments that may be obtained by combining technical measures that are modified as appropriate without departing from the gist of the present invention.

Although some of the above embodiments are described separately for convenience of explanation, it is needless to say that they may be combined and implemented within a technically allowable range.

The program operated on each device according to the embodiment is a program that controls the CPU, or the like (program that causes the computer to function) so as to perform the function according to the above-described embodiment. According to the embodiment, it is assumed that the device simultaneously executes a plurality of programs as needed by multitask processing. The information handled by these devices is temporarily stored in a temporary storage device (e.g., RAM) during the processing, is then stored in various storage devices such as a read only memory (ROM) and an HDD, and is read, corrected, and written by the CPU as needed.

Here, a recording medium storing the program may be any of a semiconductor medium (e.g., a ROM or a nonvolatile memory card), an optical recording medium/magneto-optical recording medium (e.g., a digital versatile disc (DVD), a magneto optical disc (MO), a mini disc (MD), a compact disc (CD), and a Blue-ray disc (BD) (registered trademark)), and a magnetic recording medium (e.g., a magnetic tape, and a flexible disk). The functions according to the above-described embodiment are performed by executing the loaded program, and also the functions according to the present invention may be performed by processing in cooperation with an operating system, other application programs or the like, based on the instruction of the program.

For market distribution, the program may be stored and distributed in a portable recording medium or transferred to a server computer connected via a network such as the Internet. In this case, it is needless to say that the present invention also includes a storage device of the server computer.

What is claimed is:

1. An image processing device comprising:
    one or more controllers;
    a device information generator that generates device information including identification information of the image processing device; and
    a scan job executor that executes a scan job, wherein
    the one or more controllers display the generated device information, and receive setting information, including a setting value of the scan job and one or more e-mail addresses to which a document data is to be sent, from a terminal device that reads the displayed device information, via a network service, and
    the one or more controllers execute the scan job by controlling the scan job executor based on the received setting information, and execute an automatic logout when the setting information is not acquired from the network service for a certain period of time after a user login and while an authentication mode is enabled.

2. The image processing device according to claim 1, wherein the one or more controllers display the device information at any time during a device startup period, a recovery from a sleep mode, an auto clear, and the user login when the authentication mode is enabled during the user login.

3. The image processing device according to claim 1, wherein the one or more controllers periodically send, to the network service, a request to acquire the setting information corresponding to the identification information.

4. The image processing device according to claim 1, wherein the device information is encoded using one or more of a quick response code, a barcode, a symbol, and an alphanumeric.

* * * * *